United States Patent
Kishikawa et al.

(10) Patent No.: US 9,609,309 B2
(45) Date of Patent: Mar. 28, 2017

(54) STEREOSCOPIC IMAGE OUTPUT SYSTEM

(71) Applicant: GEO TECHNICAL LABORATORY CO., LTD., Fukuoka-shi, Fukuoka (JP)

(72) Inventors: Kiyonari Kishikawa, Fukuoka (JP); Tsubasa Tomitaka, Fukuoka (JP); Masaya Ada, Fukuoka (JP); Tatsuji Kimura, Fukuoka (JP)

(73) Assignee: Geo Technical Laboratory Co., Ltd., Fukuoka-shi (JP)

( * ) Notice: Subject to any disclaimer, the term of this patent is extended or adjusted under 35 U.S.C. 154(b) by 12 days.

(21) Appl. No.: 14/809,102

(22) Filed: Jul. 24, 2015

(65) Prior Publication Data
US 2015/0334377 A1  Nov. 19, 2015

Related U.S. Application Data

(63) Continuation of application No. PCT/JP2014/000816, filed on Feb. 18, 2014.

(30) Foreign Application Priority Data

Feb. 20, 2013  (JP) ................. 2013-031106

(51) Int. Cl.
  H04N 13/02  (2006.01)
  G02B 27/22  (2006.01)
  H04N 13/04  (2006.01)
(52) U.S. Cl.
  CPC ....... *H04N 13/0278* (2013.01); *G02B 27/225* (2013.01); *H04N 13/0275* (2013.01); *H04N 13/0296* (2013.01); *H04N 13/0409* (2013.01)
(58) Field of Classification Search
  CPC ................. H04N 13/0022; H04N 2013/0081
  (Continued)

(56) References Cited

U.S. PATENT DOCUMENTS

2003/0161040 A1 * 8/2003 Ishii .................. G02B 27/2214
                                                                  359/463
2006/0171028 A1   8/2006 Oikawa et al.
(Continued)

FOREIGN PATENT DOCUMENTS

JP    2005-181377    7/2005
JP    2009-211718    9/2009
(Continued)

OTHER PUBLICATIONS

Search Report dated Apr. 15, 2014 from International Application No. PCT/JP2014/000816.
(Continued)

*Primary Examiner* — Thomas Lett
(74) *Attorney, Agent, or Firm* — Beyer Law Group LLP

(57) ABSTRACT

A stereoscopic image output system includes a stereoscopic vision output unit, an image database storage unit, and an output control unit. The stereoscopic vision is realized by outputting, from the stereoscopic vision output unit, a left-eye image and a right-eye image with parallax such that the left and right-eye images are visually recognized by the left and right eyes, respectively. Left-eye parallel projection data and right-eye parallel projection data are generated by parallel projection of a three-dimensional model using respective projection angles set for the left eye and right eye so as to produce the parallax therebetween, and stored in the database storage unit as two-dimensional drawing data. The output control unit controls an output range of the left and right-eye images. If the output range for the stereoscopic image changes, moving directions of the left-eye image and the right-eye image are individually determined by the output control unit.

10 Claims, 20 Drawing Sheets

(58) Field of Classification Search
USPC .......................................................... 345/419
See application file for complete search history.

(56) References Cited

U.S. PATENT DOCUMENTS

| | | |
|---|---|---|
| 2010/0194864 A1 | 8/2010 | Kokojima et al. |
| 2011/0090215 A1* | 4/2011 | Ohta ................. H04N 13/0275 345/419 |
| 2011/0102425 A1* | 5/2011 | Ohta ................. H04N 13/0203 345/419 |
| 2012/0120055 A1* | 5/2012 | Seong ............... H04N 13/0022 345/419 |
| 2012/0306857 A1* | 12/2012 | Hayashida ......... H04N 13/0275 345/419 |
| 2013/0057550 A1 | 3/2013 | Kishikawa et al. |
| 2013/0090787 A1* | 4/2013 | Ryu ....................... G01S 13/94 701/3 |
| 2013/0120370 A1* | 5/2013 | Okamoto ............... G06T 15/00 345/419 |
| 2015/0195512 A1* | 7/2015 | Kishikawa ............. G06T 17/05 348/55 |

FOREIGN PATENT DOCUMENTS

| | | |
|---|---|---|
| JP | 2012-17437 | 1/2012 |
| JP | 2012-150823 | 8/2012 |

OTHER PUBLICATIONS

European Search Report dated Aug. 25, 2016 from European Application No. EP 14754311 (Issued Sep. 1, 2016).

* cited by examiner

STEREOSCOPIC IMAGE OUTPUT SYSTEM

CLAIM OF PRIORITY

This application is a Continuation of International Patent Application No. PCT/JP2014/000816, filed on Feb. 18, 2014, which claims priority to Japanese Patent Application No. 2013-031106, filed on Feb. 20, 2013, each of which is hereby incorporated by reference.

BACKGROUND OF THE INVENTION

1. Field of the Invention

The present invention relates to a stereoscopic image output system for performing stereoscopic vision by outputting an image for the right eye and an image for the left eye with parallax.

2. Description of the Related Art

In an electronic map used in a navigation apparatus, a computer screen and the like, a three-dimensional map expressing features such as a building in a three-dimensional manner is used in some cases. The three-dimensional map is usually expressed by drawing a three-dimensional model in a three-dimensional manner using a perspective projection and the like.

Here, the three-dimensional map includes a large number of features, and the number of three-dimensional models is also large and thus, a load on drawing processing of the three-dimensional map might become extremely high. As a method for reducing such load, Japanese Unexamined Patent Application Publication No. 2012-150823 discloses a technology in which a projection image obtained by parallel projection of a three-dimensional model in advance is constructed as a two-dimensional image database, and the three-dimensional map is displayed using it.

On the other hand, a technology of stereoscopic vision by displaying an image for the right eye and an image for the left eye with parallax has spread in recent years, and a display for realizing such stereoscopic vision has begun to be utilized widely.

Japanese Unexamined Patent Application Publication Nos. 2009-211718 and 2012-174237 are technologies relating to such stereoscopic vision. Japanese Unexamined Patent Application Publication No. 2009-211718 discloses a technology of realizing stereoscopic vision by applying correction processing for eliminating a perspective of an image obtained by perspective projection. Japanese Unexamined Patent Application Publication No. 2012-174237 discloses a technology of realizing stereoscopic vision by shifting a two-dimensional object such as an icon to right or left so as to give parallax.

By applying these stereoscopic vision technologies, a depth feeling of the three-dimensional map can be felt more real, and usability of the three-dimensional map can be improved.

BRIEF DESCRIPTION OF THE INVENTION

However, in order to realize stereoscopic vision, two virtual cameras for right eye and left eye need to be installed at viewpoint of the three-dimensional map so as to generate an image for the left eye and an image for the right eye by performing perspective projection by the respective cameras, whereby a processing load twice the usual perspective projection is required. Since the three dimensional map might be displayed on a terminal with low processing capacity such as a navigation apparatus or a portable terminal, an increase in the processing load for drawing is an unignorable problem.

In order to reduce the processing load, realization of stereoscopic vision using an image obtained by parallel projection can be considered, but an image obtained by projecting a three-dimensional model can not realize stereoscopic vision only by being shifted to right or left, unlike a two-dimensional object. Moreover, as long as it is used as a map, even when a center point in map display is moved and the map is scrolled, an image for the left eye and an image for the right eye should be fused so that stereoscopic vision is realized.

Such problem similarly occurs not only when a map is displayed electronically but also when an arbitrary spot in the map is segmented, and an image for the left eye and an image for the right eye are printed so as to realize stereoscopic vision. Moreover, this is a common problem not only in maps but also in an output of an image capable of stereoscopic vision of various three-dimensional models such as a virtual space generated by computer graphics and the like and design models for machines, buildings and the like. The present invention is made in view of these problems and has an object to realize stereoscopic vision of an image using parallel projection.

One embodiment of the present invention provides a stereoscopic image output system for stereoscopic vision of an image which can be constituted to include a stereoscopic vision output unit, an image database storage unit, and an output control unit. The stereoscopic vision output unit realizes stereoscopic vision by outputting an image for the left eye (a left-eye image) and an image for the right eye (a right-eye image) with parallax that can be visually recognized by the left eye and the right eye, respectively. The image database storage unit stores parallel projection data for the left eye (left-eye parallel projection data) and parallel projection data for the right eye (right-eye parallel projection data) as two-dimensional drawing data obtained by projecting a three-dimensional model to be a target of stereoscopic vision on a plane by parallel projection from diagonal (oblique) directions inclined from a vertical direction by predetermined projection angles respectively set so as to generate parallax between the left and right eyes. The output control unit outputs the image for the left eye and the image for the right eye with parallax for outputting an image in a specified output range to the stereoscopic vision output unit on the basis of the parallel projection data for the left eye and the parallel projection data for the right eye. If the output range moves, the output control unit determines moving directions of the image for the left eye and the image for the right eye individually, reads the parallel projection data for the left eye and the parallel projection data for the right eye in accordance with the moving directions and outputs the image for the left eye and the image for the right eye.

According to one embodiment of the present invention, by individually setting the projection angle so as to give parallax to the left and right eyes, stereoscopic vision can be realized also in parallel projection. That is, in the parallel projection, projections are made in the diagonal directions inclined from the vertical direction in order to perform projection with a three-dimensional feeling. This projection direction can be expressed by a pitch angle indicating an inclination to a first reference direction from the vertical direction and a yaw angle indicating an inclination to a plane including the vertical angle and the first reference direction. By inverting the signs of the yaw angles of the left and right eyes, parallax can be given to the both eyes. In the parallel projection, there is no concept of a viewpoint, and a virtual camera positions corresponding to the left and right eyes can not be set, but as described above, by making the projection direction different between the left and right eyes, stereoscopic vision can be realized.

Since there is no specific viewpoint in the parallel projection, a projection image, that is, parallel projection data can be generated in advance for all the regions. When stereoscopic vision is to be realized, too, since images for the left and right eyes are generated by parallel projection, respectively, such advantage is not lost. Therefore, according to one embodiment of the present invention, only by reading and outputting the parallel projection data for the left and right eyes prepared in advance as appropriate, there is an advantage that stereoscopic vision can be realized with a light load.

In one embodiment of the present invention, while stereoscopic vision is realized by parallel projection as above, moving directions of the image for the left eye and the image for the right eye are further determined individually when the output range is moved. In one embodiment of the present invention, since the projection direction of the parallel projection is different between the left eye and the right eye, even if a coordinate value in the image for the left eye and a coordinate value in the image for the right eye match each other, the coordinate values do not necessarily indicate the identical spot. Therefore, when the output ranges of the images are to be moved, if the image for the left eye and the image for the right eye are both moved in the same direction by the same moving amount, a phenomenon that different output ranges are outputted for the left and right eyes occurs. In one embodiment of the present invention, based on the feature of the images for the left and right eyes generated by the parallel projection, by individually determining the moving directions for the image for the left eye and the image for the right eye, occurrence of a discrepancy in the output ranges between the both images can be suppressed, and stereoscopic vision can be continued.

As a three-dimensional model to be a target of stereoscopic vision in one embodiment of the present invention, various three-dimensional models including a map, a virtual space generated in computer graphics and the like and design models such as machines, buildings and the like can be considered. Particularly, as the three-dimensional model in the case of stereoscopic vision of a map, a model three-dimensionally expressing a shape of a feature such as an artificial object, a natural object and the like is applicable.

Moreover, as the stereoscopic output unit of one embodiment of the present invention, for example, a stereoscopic display displaying the image for the left eye and the image for the right eye so that they can be individually recognized by the left and right eyes, respectively, can be used. A printing apparatus for arranging and printing the image for the left eye and the image for the right eye such that stereoscopic vision is realized by being placed behind a lens for stereoscopic vision called a lenticular may be used. It may be a printing apparatus for printing by simply aligning the image for the left eye and the image for the right eye on the left and right.

In accordance with one embodiment of the present invention, the moving directions of the image for the left eye and the image for the right eye can be determined by various methods, for example, the output control unit may determine the moving directions of the image for the left eye and the image for right eye on the basis of parameters of the parallel projection.

A difference in the moving directions between the image for the left eye and the image for the right eye when the output ranges are moved is caused by a difference in the parameters of the parallel projection in the both images. Therefore, by considering the parameters of the parallel projection, the moving directions for matching the output ranges of the image for the left eye and the image for the right eye can be determined with accuracy. The moving direction can be calculated by a method in which coordinate axes for the image for the left eye and the image for the right eye converted from the two-dimensional coordinate axis indicating a plane when seen vertically below on the basis of the parameters of the parallel projection are acquired and calculation is made on this coordinate conversion, for example. The moving direction may be calculated for each movement of the output range but in the parallel projection, since the moving direction is common for all the regions, the moving directions for the left eye and the right eye may be acquired in advance.

In accordance with one embodiment of the present invention, the image data storage unit further stores two-dimensional object data for outputting a two-dimensional object into the image, and the output control unit may output the image for the left eye and the image for the right eye with parallax by offsetting the two-dimensional object data to left or right with respect to a predetermined output position.

As the two-dimensional object, characters indicating the name of the feature and other three dimensional models, various symbols and the like are applicable.

By giving parallax by a method different from the three-dimensional model to such a two-dimensional object, the two-dimensional object can be expressed in the stereoscopic image with a light load. Moreover, since in the two-dimensional object, a depth feeling can be changed by changing a displacement amount in left or right, the depth feeling can be changed in accordance with the type of the object or the like, and versatile stereoscopic vision can be realized.

In the above described aspect, the parallax may be given to the two-dimensional object when the image for the left eye and the image for the right eye are outputted. Moreover, in a state including image data of the two-dimensional object arranged with the parallax between the left and right eyes in advance, parallel projection data for the left eye and parallel projection data for the right eye may be prepared.

In accordance with one embodiment of the present invention, all of the above described various features do not necessarily have to be provided, and one embodiment of the present invention may be constituted by omitting a part of it or by combination as appropriate.

Moreover, the present invention may also be constituted in various aspects other than the configuration as a stereoscopic image output system.

For example, one embodiment of the present invention may be configured as an image data generating device for generating image data for a stereoscopic image output system which outputs a stereoscopic image by outputting an image for the left eye and an image for the right eye with parallax so that they can be visually recognized by the left eye and the right eye, respectively, provided with a 3D image database storage unit, a parallel projection unit, a two-dimensional object image data generating unit, and a superposition processing unit.

The 3D image database storage unit stores a three-dimensional model to be a target of a stereoscopic vision and two-dimensional object data for outputting a two-dimensional object in the stereoscopic image. The parallel projection unit generates parallel projection data for the left eye and parallel projection data for the right eye as two-dimensional drawing data obtained by projecting the three-dimensional model on a plane by parallel projection from diagonal directions inclined from a vertical direction by predetermined projection angles respectively set so as to generate parallax between the left and right eyes by the unit of a mesh having a predetermined size. The two-dimensional object image data generating unit generates two-dimensional object image data for the left eye and two-dimensional object image data for the right eye by giving parallax by offsetting the two-dimensional object data to left or right with respect to a predetermined output position. The superposition processing unit generates image data for the left eye and image data for the right eye by superposing the generated two-dimensional object image data for the left eye and two-dimensional object image data for the right eye on the parallel projection data for the left eye and parallel projection data for the right eye at positions considering the parallax.

According to such an aspect, the parallel projection data for the left and right eyes can be generated by parallel projection on the basis of the three-dimensional model. Moreover, parallax can be given by offsetting the two-dimensional object data to left or right so that the two-dimensional object image data for the left and right eyes can be generated. Then, the image data for the left and right eyes in which the both are superposed can be also generated. In this way, by reading and outputting data corresponding to the output range from the image data for the left and right eyes, a stereoscopic image including the two-dimensional object can be outputted with a light load.

One embodiment of the present invention may also be configured as a stereoscopic image output method for outputting a stereoscopic image by a computer or may be configured as a computer program for allowing a computer to execute such output. Moreover, one embodiment of the present invention may also be configured as a computer-readable recording medium recording such computer program. As the recording medium, various mediums such as a flexible disk, a CD-ROM, a magneto-optical disk, an IC card, a ROM cartridge, a punch card, a printed matter on which codes such as a barcode are printed, an internal storage apparatus (memory such as a RAM and a ROM) and an external storage apparatus of a computer and the like can be used.

DETAILED DESCRIPTION OF EMBODIMENTS OF THE INVENTION

Example 1

Regarding one embodiment of the present invention, an example configured as a stereoscopic map display system for displaying a stereoscopic map as an example in stereoscopic images will be described. Here, a system for displaying a map in a three-dimensional manner and capable of stereoscopic vision by parallel projection and also for displaying characters and the like drawn on that will be exemplified capable of stereoscopic vision. In a meaning not of a map drawn simply three-dimensionally but of a map capable of stereoscopic vision, a map displayed in the example will be referred to as a stereoscopic map.

Moreover, while the map is displayed three-dimensionally, characters, symbols and the like are two-dimensional data, and thus, they might be also referred to as a two-dimensional object in the example below.

A. Principle of Stereoscopic Vision by Parallel Projection:

First, a principle for realizing stereoscopic vision by parallel projection will be described.

Figure 1A:
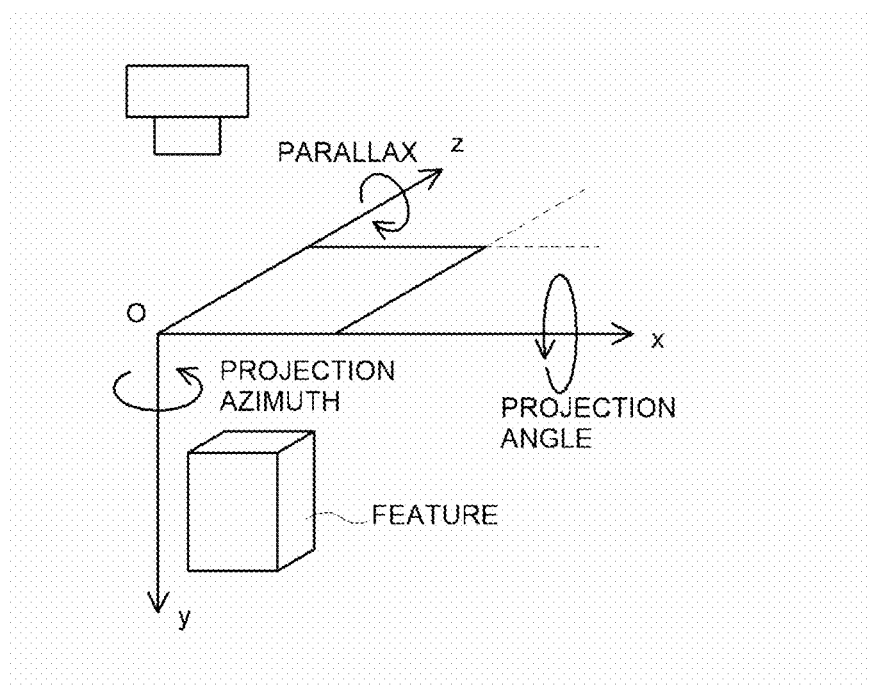
FIGS. 1A and 1B are explanatory diagrams illustrating a principle of stereoscopic vision by parallel projection.
Figure 1B:
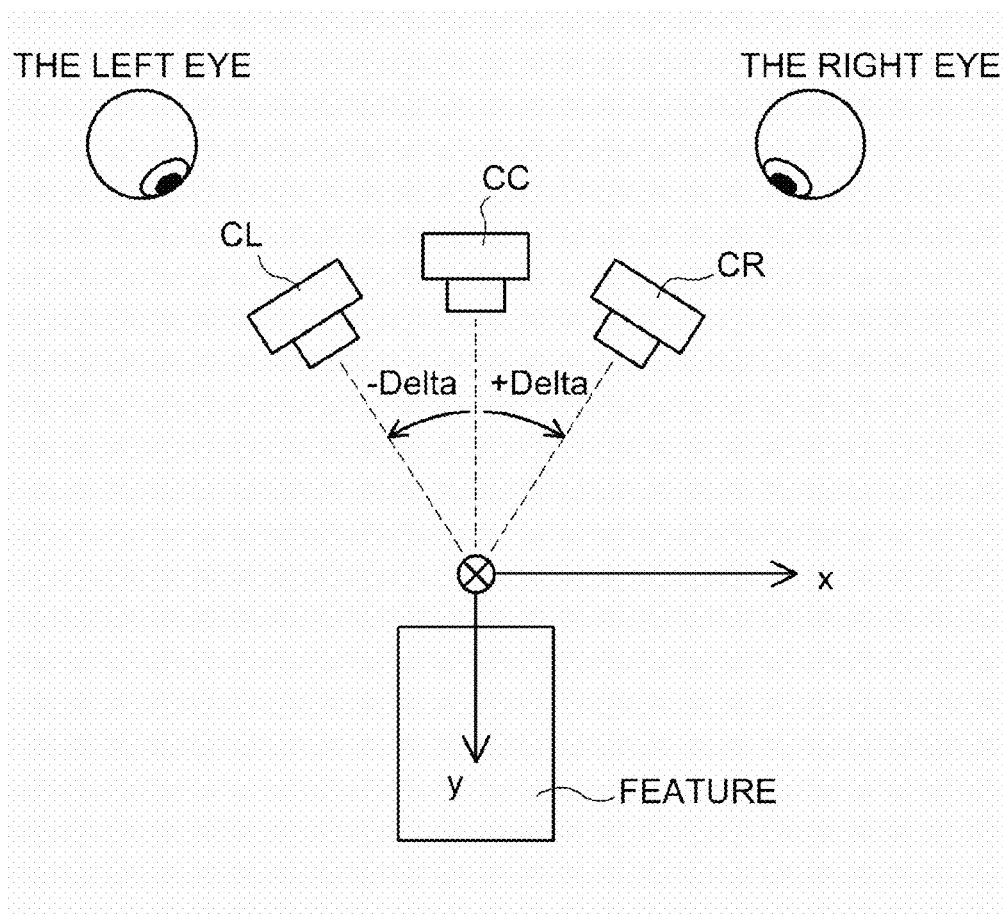

FIGS. 1A and 1B are explanatory diagrams illustrating the principle of stereoscopic vision by parallel projection. As illustrated in FIG. 1A, three axes are defined. That is, the x-axis and the z-axis are defined on a horizontal plane, and the y-axis is defined in a vertical lower direction. The x-axis, y-axis, and z-axis are a right-handed coordinate system. As illustrated, a camera is placed vertically above a feature, and parallel projection is performed so that a two-dimensional map is drawn. The parallel projection referred to in this example is projection with the camera inclined from this state.

In the parallel projection, there is no "viewpoint", unlike perspective projection. In this description, if a term of a camera is used in relation with parallel projection, a projection direction is schematically indicated.

In FIG. 1A, if the camera is rotated around the x-axis, it is equal to parallel projection with diagonal inclination from the vertical direction, so the rotation around the x-axis indicates a pitch angle. Moreover, if the camera is rotated in the y-axis direction, it changes an azimuth of the parallel projection in a horizontal direction, so the rotation around the y-axis indicates a projection azimuth. Then, if the camera is rotated around the z-axis, parallax can be given as described below.

FIG. 1B illustrates a reason why parallax is generated. FIG. 1B is a state in which a feature is seen in the z-axis direction, that is, in a state in which the z-axis is perpendicular to the figure plane. The parallax is a difference in visual-line directions generated by a difference in positions of the right eye and the left eye when this feature is seen in the y-axis direction from vertically above. Therefore, by projecting at a camera position CR corresponding to a state seen from the right eye and a camera position CL corresponding to a state seen from the left eye to a reference camera position CC in the figure, images for the right eye/left eye with parallax can be generated. The parallax, that is, a rotation angle δ around the z-axis can be set arbitrarily, but as an angle that can give parallax without sense of discomfort, approximately 20 degrees can be set, for example.

By performing parallel projection with consideration to the parallax illustrated in FIG. 1B in addition to the projection angle and the projection azimuth as described above, images for the right eye/left eye capable of stereoscopic vision can be generated even by the parallel projection.

Figure 2A:
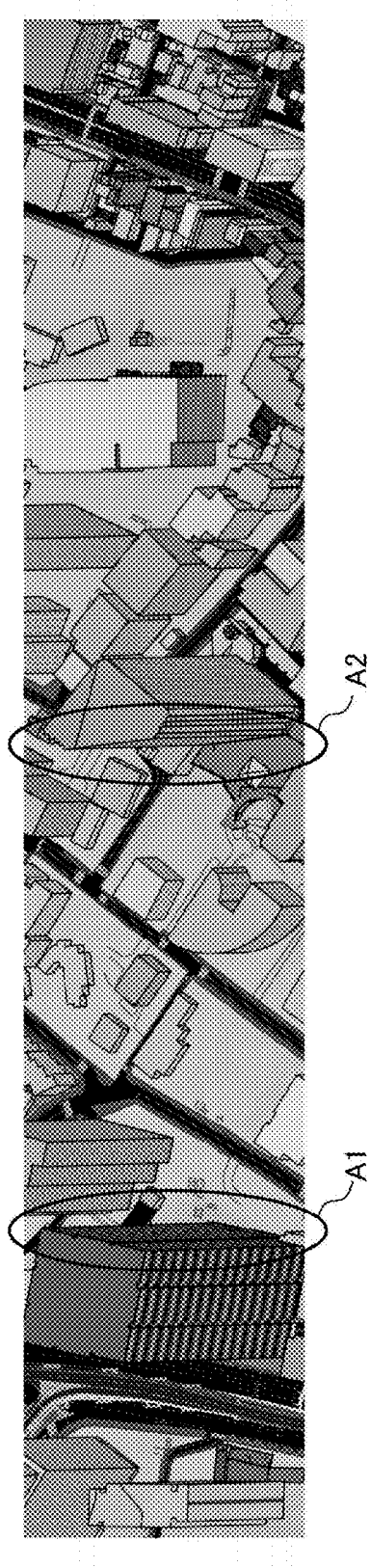
FIGS. 2A and 2B are explanatory diagrams illustrating an example of parallel projection data for right eye/left eye.
Figure 2B:
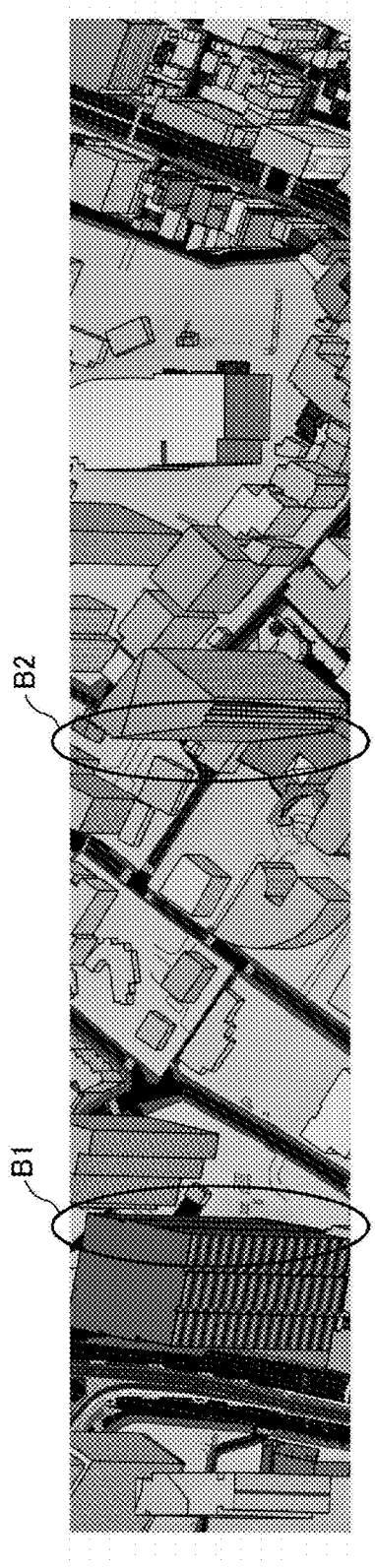

FIGS. 2A and 2B are explanatory diagrams illustrating an example of parallel projection data for the right eye/left eye. FIG. 2A illustrates parallel projection data for the right eye, and FIG. 2B illustrates parallel projection data for the left eye. In the respective images, the features are displayed three-dimensionally by parallel projection. For example, if a region A1 and a region B1 as well as a region A2 and a region B2 are compared, respectively, a difference in parallax for the right eye/left eye can be recognized from how a side wall of a building is drawn or the like. Using the parallel projection data for the right eye/left eye prepared as above, a three-dimensional map can be viewed three-dimensionally.

B. Influence by Parallel Projection:

FIGS. 3A through 3E are explanatory diagrams illustrating a method (1) for setting parallel projection parameters.

Figure 3A:
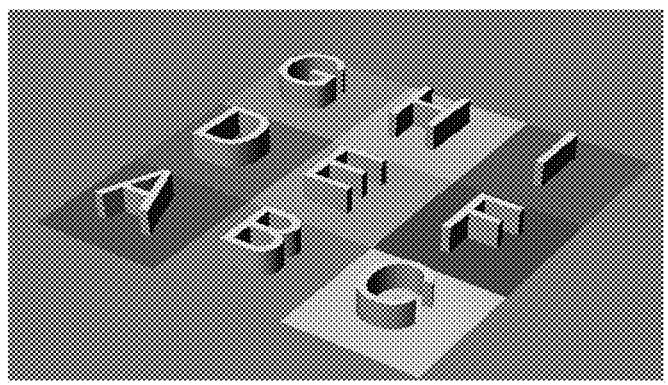
FIGS. 3A through 3E are explanatory diagrams illustrating a method for setting parallel projection parameters in accordance with one embodiment of the present invention.

FIG. 3A illustrates an example of a three-dimensional model. Here, as illustrated, a model of three-dimensional shapes of alphabets A to I, each having a height, will be described as an example.

Figure 3B:
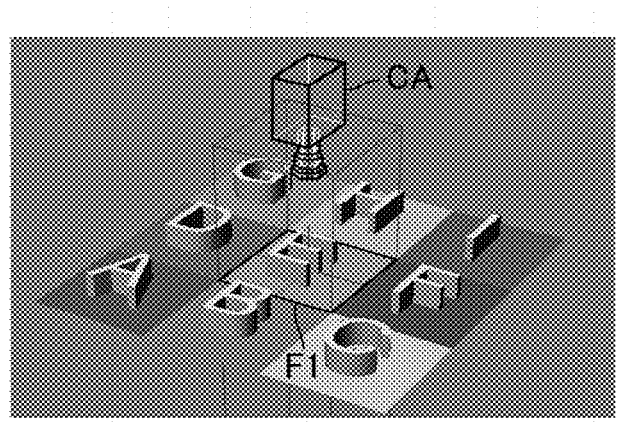

FIG. 3B illustrates a state of parallel projection if a camera CA is set perpendicularly downward. As illustrated, the camera CA for parallel projection is set just above a region F1 including the alphabet "E" at the center by being directed vertically downward. As described above, since there is no specific "viewpoint" in parallel projection, the camera CA illustrated in FIG. 3B only schematically illustrates a projection direction of the parallel projection.

Figure 3C:
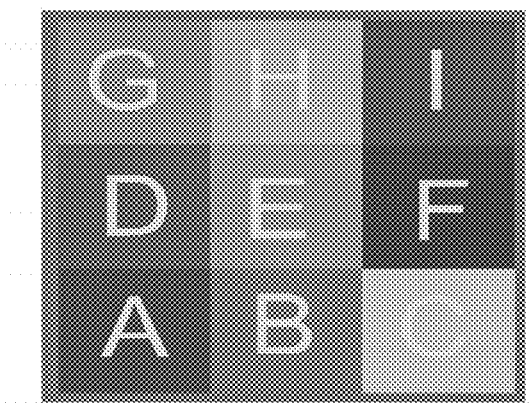

FIG. 3C illustrates a projection result obtained by the parallel projection in FIG. 3B. By projection perpendicularly downward, a planar projection result is obtained as illustrated in FIG. 3C. That is, so-called two-dimensional map is obtained with respect to the three-dimensional model as illustrated in FIG. 3A.

Figure 3D:
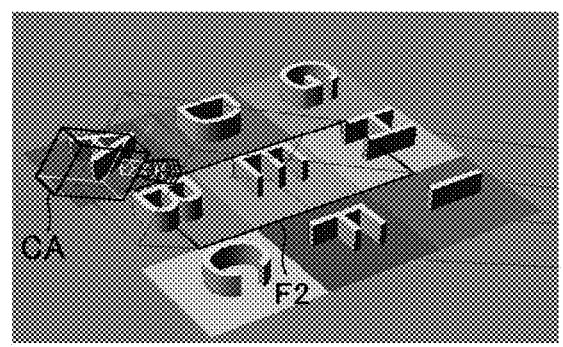

FIG. 3D illustrates a state in which the camera CA is inclined diagonally to a direction of the alphabet "B" only by the pitch angle from the vertically downward. As a result, a region F2 projected by the camera CA has a rectangular shape extended in an inclined direction according to the pitch angle.

Figure 3E:
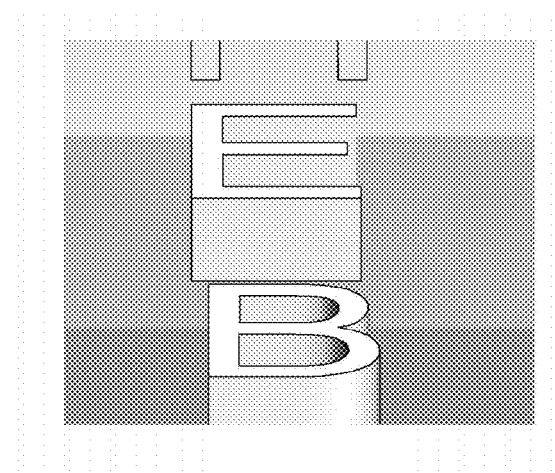

FIG. 3E illustrates a projection result if the camera CA is inclined as in FIG. 3D.

FIGS. 4A through 4D are explanatory diagrams illustrating a method (2) for setting parallel projection parameters.

Figure 4A:
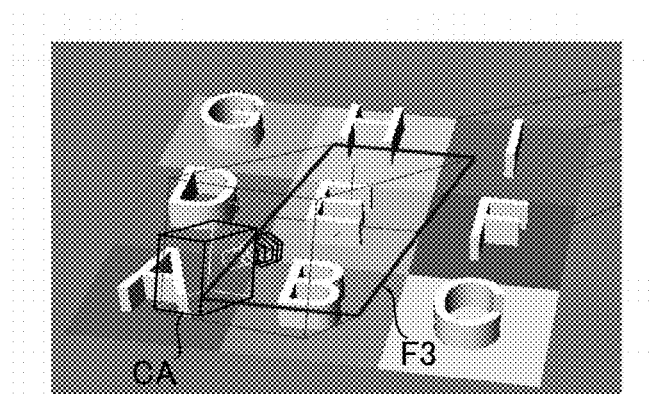
FIGS. 4A through 4D are explanatory diagrams illustrating a method for setting the parallel projection parameter in accordance with another embodiment of the present invention.

FIG. 4A illustrates a state obtained by shifting the yaw angle from the state inclined only by the pitch angle as in FIG. 3D, that is, a state in which the model is rotated only by an angle δ illustrated in FIG. 1B. By shifting the yaw angle as above, a projected region F3 has a parallelogram as illustrated.

Figure 4B:
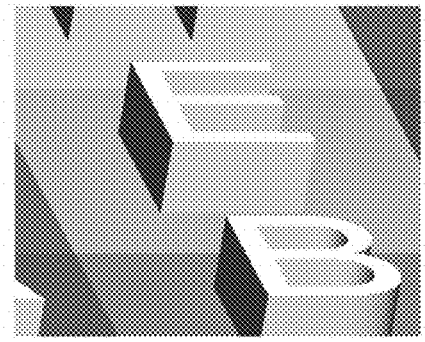

FIG. 4B illustrates a projection result obtained by parallel projection in a state of FIG. 4A. By performing parallel projection from a diagonal direction by shifting the pitch angle and the yaw angle as above, the three-dimensional model can be expressed three-dimensionally.

Figure 4C:
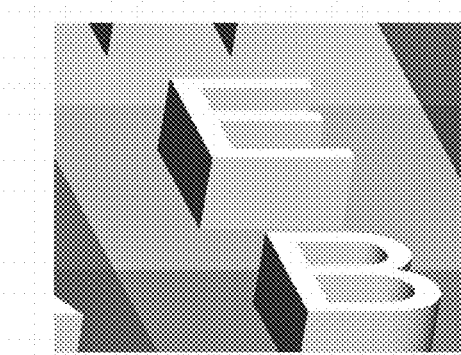
Figure 4D:
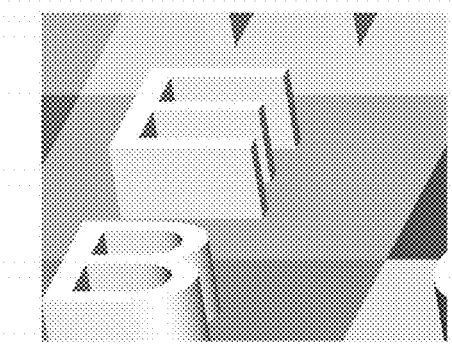

FIG. 4C illustrates an image for the left eye generated by the above described parallel projection, and FIG. 4D illustrates an image for the right eye. In stereoscopic vision by parallel projection, parallax is given by inverting the signs of the yaw angles in FIG. 4B of the left and right eyes, as is known from a region surrounding the alphabet "E" in the figure, the projected region has a parallelogram in a diagonally left direction for the image for the left eye and a parallelogram in a diagonally right direction for the image for the right eye.

Figure 5A:
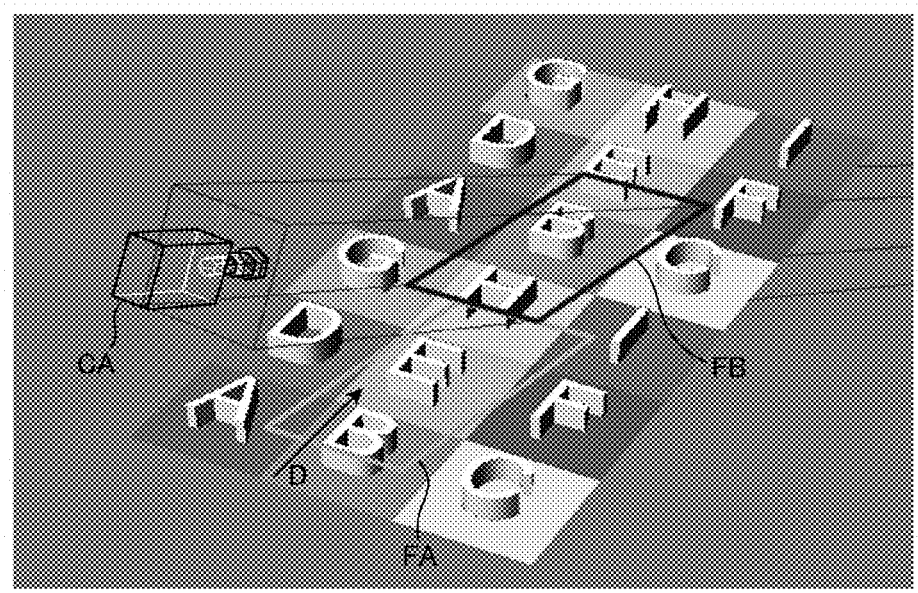
FIGS. 5A through 5C are explanatory diagrams illustrating a relationship between the parallel projection and a mesh.
Figure 5B:
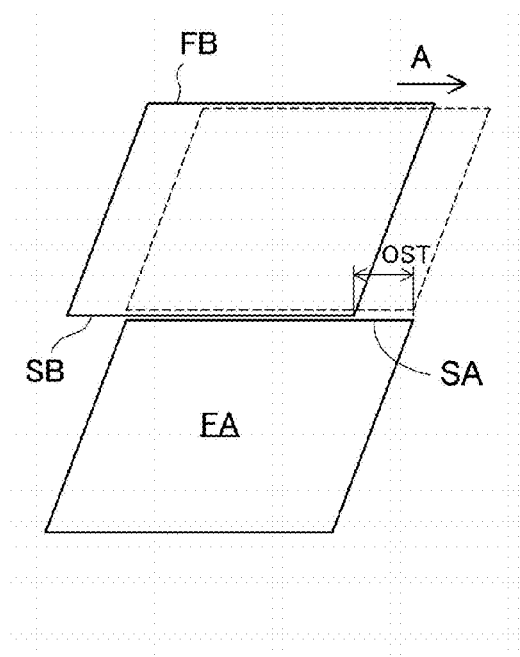
Figure 5C:
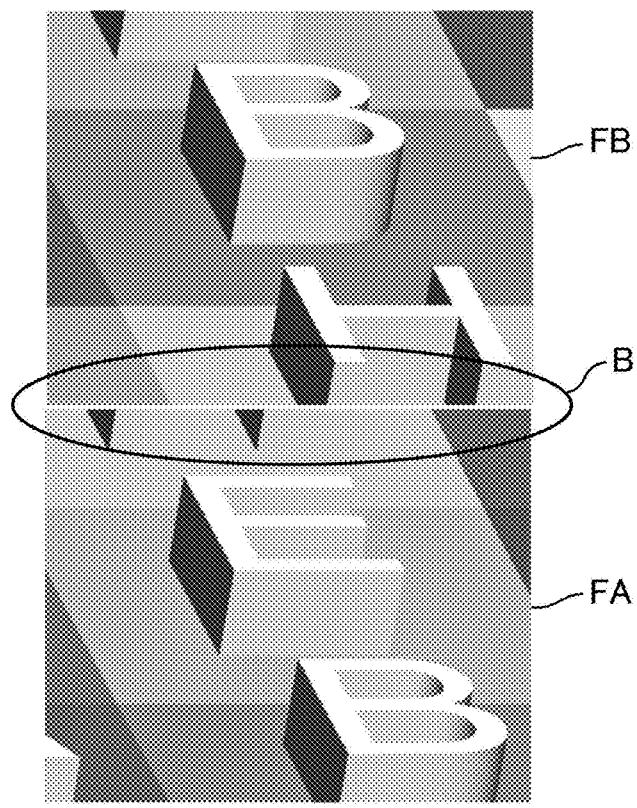

FIGS. 5A through 5C are explanatory diagrams illustrating a relationship between parallel projection and a mesh. Map data is usually prepared by being divided into rectangular regions, each having a certain size called mesh. FIGS. 5A through 5C illustrate an influence if stereoscopic vision by parallel projection is applied to a map divided into the meshes as above.

FIG. 5A illustrates a state in which a map divided into meshes is parallelly projected. As described in FIGS. 4A through 4D, if being parallelly projected, a region projected by the camera CA becomes a parallelogram such as regions FA and FB. Assuming that a result of parallel projection of a certain mesh is expressed as the region FA, the result of parallel projection of a mesh adjacent in an arrow D direction is expressed as the region FB. That is, before the parallel projection, rectangular meshes are aligned, but after the parallel projection, each mesh is deformed into a parallelogram and causes a discrepancy as indicated between the regions FA and FB.

FIG. 5B is an enlarged diagram of the regions FA and FB. Only a shape of each region is illustrated. As described above, a discrepancy having an offset amount OST is generated between sides SA and SB in contact with the regions FA and FB. The distance OST is determined in accordance with parallel projection parameters, that is, a pitch angle θ and a yaw angle δ at the parallel projection. That is, a mesh of a unit length can be expressed as follows by a coordinate conversion of sequentially rotating only by the pitch angle θ and a yaw angle δ: OST=sin δ·sin θ·cos θ

Therefore, if the regions FA and RB are to be aligned, shifting by the offset amount OST in an arrow A direction is necessary.

FIG. 5C illustrates a state in which the regions FA and FB are arranged without alignment. That is, the regions FA and FB are simply arranged, even though there is a discrepancy between them as illustrated in FIG. 5A. FIG. 5A is to show the shape of the region, and positions of the alphabets A to I are illustrated in a state before the parallel projection, but actually, if parallel projection is performed for each mesh, a discrepancy is generated between images at a boundary B between the regions FA and FB as illustrated in FIG. 5C.

The pitch angle θ and the yaw angle δ used in the parallel projection can be set arbitrarily, but as parameters used in the parallel projection for realizing stereoscopic vision, it may be approximately set such that the pitch angle θ=22.5 degrees and the yaw angle δ=20 degrees, for example. If such parallel projection parameters are used, the discrepancy illustrated in FIG. 5C is known to be contained in approximately several pixels.

Figure 6A:
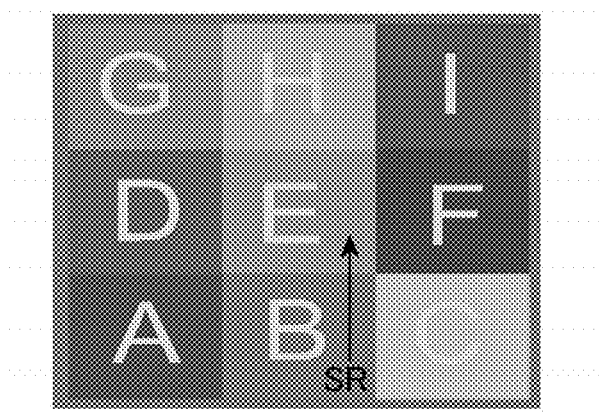
FIGS. 6A and 6B are explanatory diagrams illustrating an influence given by the parallel projection to scrolling.
Figure 6B:
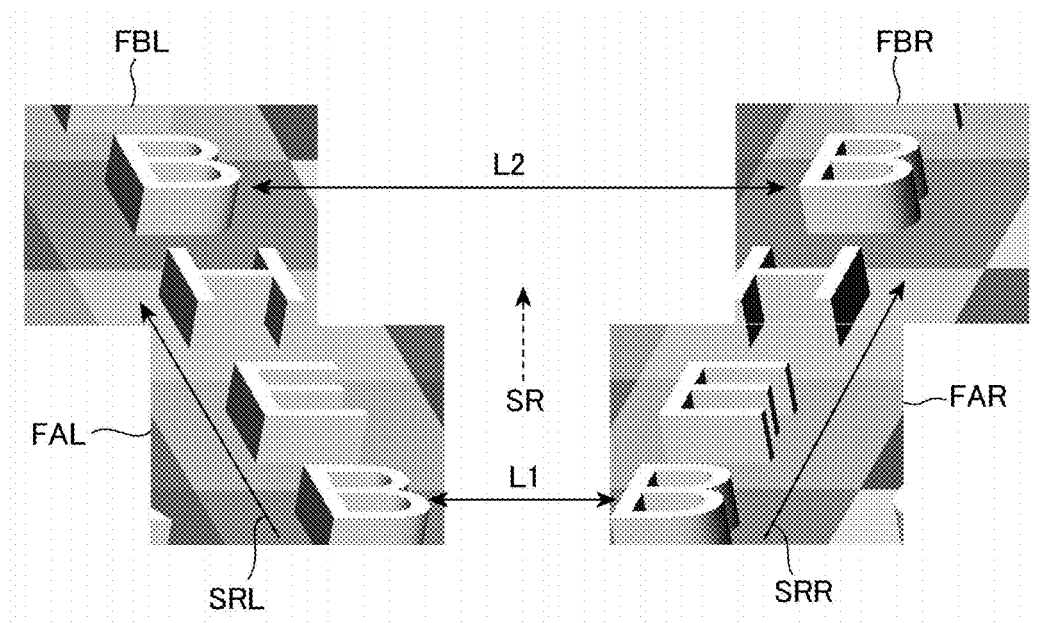

FIGS. 6A and 6B are explanatory diagrams illustrating an influence given by the parallel projection to scrolling.

As illustrated in FIG. 6A, assume that a display range is moved from the alphabet "B" to "E" on a two-dimensional "map", that is, in an arrow SR direction.

FIG. 6B illustrates images for the left eye FAL and FBL and images for the right eye FAR and FBR, obtained by parallel projection for realizing stereoscopic vision. In a state before scrolling, it is assumed that the alphabet "B" portion in the regions FAL and FAR illustrated in a lower side is displayed. At this time, parallax between the image FAL for the left eye and the image FAR for the right eye is a distance L1, and it is assumed that fusion of the both is realized by this parallax, and stereoscopic vision is enabled.

Subsequently, the display range is moved in the SR direction. At this time, as illustrated in FIG. 4 above, it is assumed that the display range is simply moved in the arrow SR direction similarly to a two-dimensional plane, without considering that each of the images FAL and FBL for the left eye and the images FAR and FBR for the right eye has its original rectangular region projected to a parallelogram region by parallel projection. Then, the display range should have been moved along the alignment of the alphabets B, E, H, and B, but in the images FAL and FBL for the left eye, many useless portions are included on the right side of the alignment, while in the images FAR and FBR for the right eye, many useless portions are included on the left side to the contrary. As a result, in the alphabet "B" portion, for example, parallax L2 becomes larger than the initial parallax L1, fusion cannot be achieved, and stereoscopic vision can not be realized. That is, the alphabet "B" is visually recognized only in a doubly shifted state. In order to avoid such a phenomenon, the moving direction of the display range needs to be set individually as arrows SRL and SRR, considering that the parallel projection is performed to a parallelogram in the images FAL and FBL for the left eye and the images FAR and FBR for the right eye, respectively.

Such phenomenon is caused by preparation of the images FAL and FBL for the left eye and the images FAR and FBR for the right eye in advance for all the regions. In this example, as described above, by setting the scrolling direction individually for the image for the left eye and the image for the right eye, scrolling is achieved while stereoscopic vision is realized.

Figure 7:
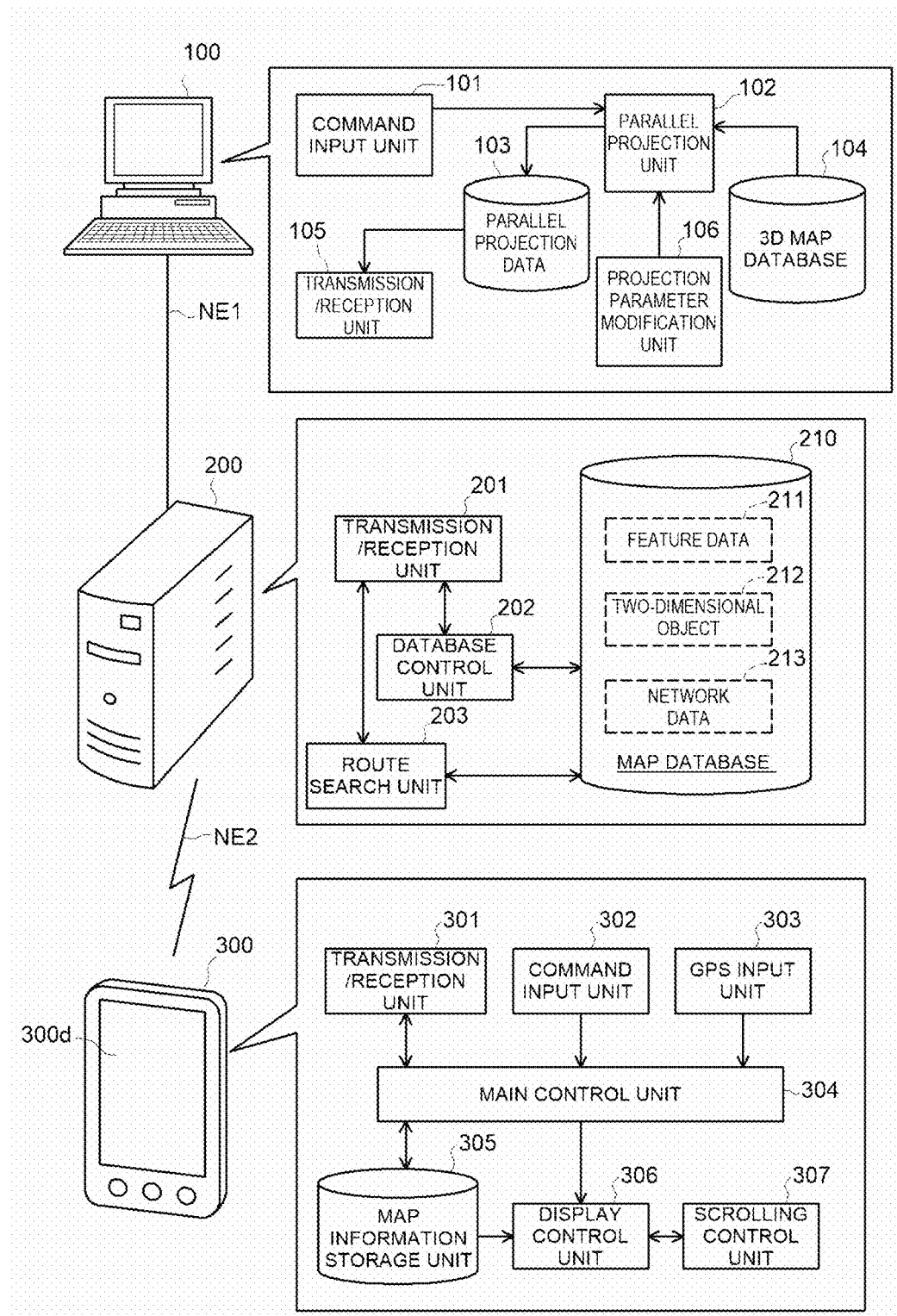
FIG. 7 is an explanatory diagram illustrating a configuration of a stereoscopic map display system in accordance with one embodiment of the present invention.

B. System Configuration:

FIG. 7 is an explanatory diagram illustrating a configuration of a stereoscopic map display system. FIG. 7 illustrates a configuration example for displaying a map on a display 300d of a terminal 300 on the basis of map data provided from a server 200 via a network NE2 or the like. A smartphone is used as the terminal 300, but a cell phone, a personal computer, a navigation apparatus and the like may also be used. Moreover, the three-dimensional stereoscopic map display system may also be configured as a system operating standalone other than the system composed of the terminal 300 and the server 200.

In the figure, a data generating apparatus 100 for generating map data is also illustrated.

The display 300d of the terminal 300 has a stereoscopic vision function which can display the image for the right eye and the image for the left eye so that they can be visually recognized by the right eye and the left eye, respectively. In this example, the display 300d capable of stereoscopic vision by so-called naked eyes is used, but a device for stereoscopic vision using glasses for stereoscopic vision and the like may also be used.

In the terminal 300, various functional blocks operating under a main control unit 304 are constituted. In this example, the main control unit 304 and each of the functional blocks are configured by installing software which realizes the respective functions, but a part of or the whole of them may be configured using hardware.

A transmission/reception unit 301 conducts communication with the server 200 via the network NE2. In this example, transmission/reception of map data and commands for displaying a stereoscopic map is mainly conducted.

A command input unit 302 inputs an instruction from a user via with an operation of a button or a touch panel and the like. As an instruction in this example, specification of a display range, expansion/contraction of a three-dimensional map, setting of a place for departure and a destination when a route guidance is to be given and the like can be cited.

A GPS input unit 303 obtains a coordinate value of latitude and longitude on the basis of a GPS (Global Positioning System) signal. Moreover, in the route guidance, an advancing direction is calculated on the basis of a change in the latitude/longitude.

A map information storage unit 305 is a buffer for temporarily storing map data provided from the server 200. If a map to be displayed is continuously changing as in the case of a route guidance, map data of a range which is not sufficient with the map information storage unit 305 is received from the server 200 so as to display a map.

A display control unit 306 displays a stereoscopic map on the display 300d of the terminal 300 using the map data stored in the map information storage unit 305.

A scrolling control unit 307 determines a scrolling direction with respect to each of an image for the left eye and an image for the right eye when a scrolling instruction is given from a user and realizes scrolling while stereoscopic vision is maintained.

In the server 200, illustrated functional blocks are configured. In this example, these functional blocks are configured by installing software which realizes the respective functions but a part of or the whole of them may be configured by hardware.

A map database 210 is a database for displaying a stereoscopic map. In this example, map data including feature data 211, a two-dimensional object 212, and network data 213 is stored. The network data 213 can be omitted.

The feature data 211 is parallel projection data for displaying features such as roads, buildings and the like three-dimensionally and capable of stereoscopic vision, and is two-dimensional polygon data obtained by parallelly projecting a three-dimensional model of a feature for the right eye/left eye, respectively, by changing a projection condition. That is, as the feature data 211, parallel projection data for the right eye as two-dimensional image data obtained by parallel projection under the condition for the right eye and parallel projection data for the left eye as two-dimensional image data obtained by parallel projection under the condition for the left eye for one map region are stored.

The two-dimensional object 212 is characters expressing a name of a feature, a name of a place, guidance information and the like which should be displayed on the map other than the features, map symbols/traffic restriction signs, symbol data indicating a current position in route guidance, polygon data of arrows constituting a route and the like. Except those with unstable display positions such as the current position or route, the two-dimensional object 212 stores data such as characters and symbols which should be displayed and display positions associated with each other. The display position may be a position on a three-dimensional space or may be a position coordinate on a projection image parallelly projected. Moreover, regarding the two-dimensional object 212 associated with a specific feature such as the feature name, data indicating association with the feature is also stored.

In this example, the two-dimensional object 212 is to give parallax at display, but as a variation, it may be configured capable of stereoscopic vision with parallax determined in advance. In such a case, the two-dimensional object 212 may be stored in a format of the image for the right eye and the image for the left eye capable of stereoscopic vision. Alternatively, image data in a state in which the feature data 211 and the two-dimensional object 212 are superposed can be stored as the feature data 211.

The network data 213 is data expressing roads by a collection of nodes and links. The node is data corresponding to an intersection of the roads and an end point of the road. The link is a line segment connecting a node to another node and is data corresponding to the road. In this example, positions of the node and the link constituting the network data 213 are determined by three-dimensional data of latitude, longitude, and height.

The transmission/reception unit 201 conducts transmission/reception of data with the terminal 300 via the network NE2. In this example, transmission/reception of the map data and the command for displaying the three-dimensional map is mainly conducted. Moreover, the transmission/reception unit 201 also conducts communication with the data generating apparatus 100 via a network NE1. In this example, send/receive of the generated map data is mainly conducted.

The database control unit 202 controls reading and writing of data with respect to the map database 210.

A route search unit 203 makes a route search using the network data 213 in the map database 210. For the route search, Dijkstra's algorithm or the like can be used. As described above, arrows indicating a route obtained by the route search and the like also fall under the two-dimensional objects.

In the data generating apparatus 100, illustrated functional blocks are configured. In this example, these functional blocks are configured by installing software which realizes the respective functions in a personal computer, but a part of or the whole of them may be configured using hardware.

A transmission/reception unit 105 sends/receives data to/from the server 200 via the network NE1.

A command input unit 101 inputs an instruction of the operator via a keyboard or the like. In this example, the specifications of regions where the map data should be generated, specifications of the parallel projection parameters and the like are included. The parallel projection parameters refer to the pitch angle and the yaw angle when parallel projection is performed. The pitch angle means an amount of inclination from the vertical direction in projection. The yaw angle means an angle (see FIG. 1) inclined in different directions for left and right eyes in order to give parallax.

A 3D map database 104 is a database for storing the three-dimensional model used for generating the map data. For features such as roads and buildings, electronic data indicating the three-dimensional shapes is stored. Moreover, two-dimensional objects such as characters and symbols which should be displayed on the map are also stored.

A parallel projection unit 102 generates feature data by drawing using parallel projection on the basis of the 3D map database 104. The drawn projection image is stored as parallel projection data 103 and stored in the feature data 211 of the map database 210 of the server 200 via the transmission/reception unit 105. A projection parameter modification unit 106 modifies the specified parallel projection parameters so that the sign of a yaw angle value is inverted when the parallel projection is performed, and the parallel projection parameters for the right eye/left eye are set. In this way, the image for the right eye and the image for the left eye for stereoscopic vision can be generated, respectively.

Figure 8A:
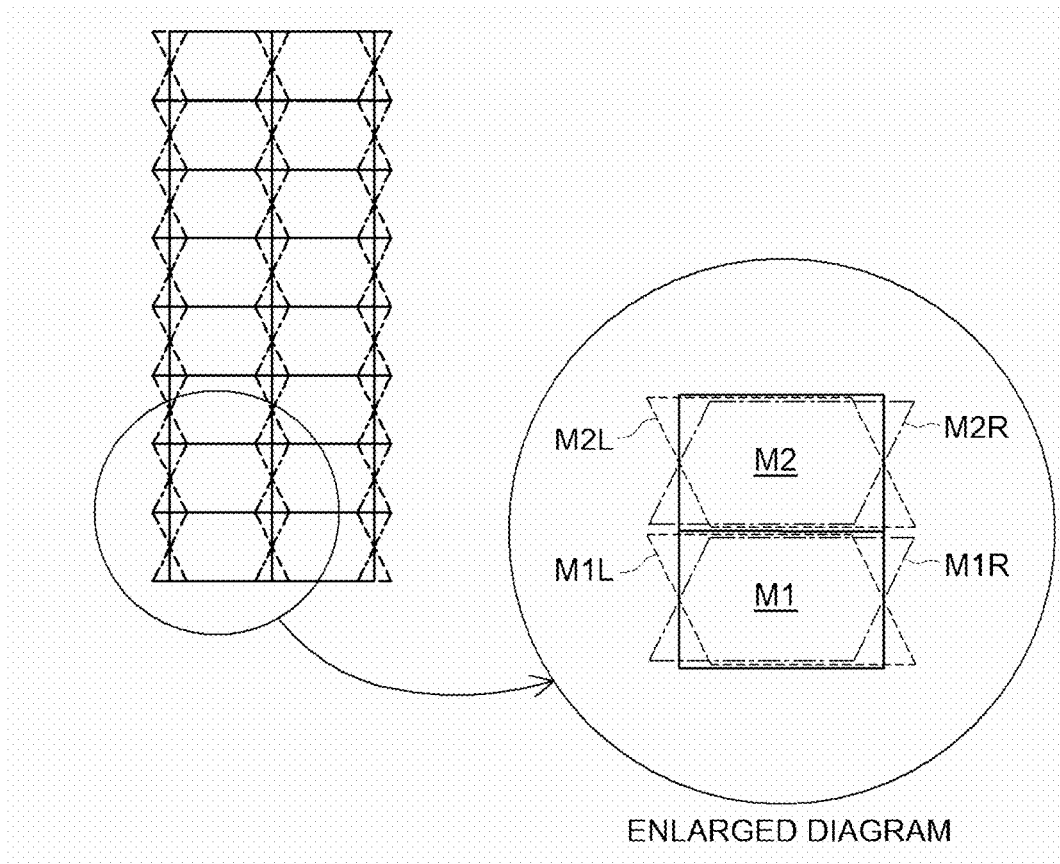
FIGS. 8A and 8B are explanatory diagrams illustrating arrangement of feature data in accordance with one embodiment of the present invention.
Figure 8B:
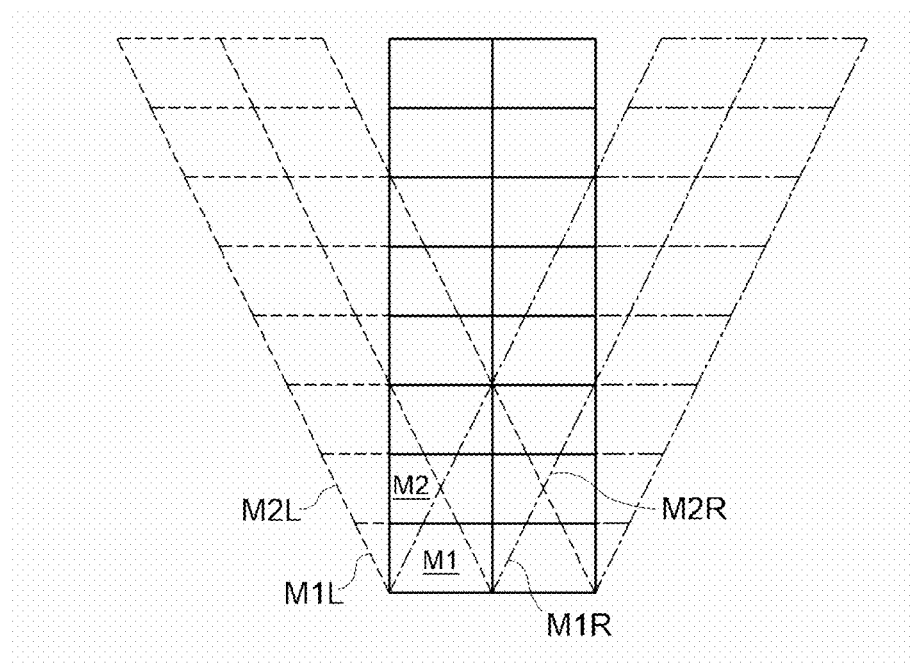

FIGS. 8A and 8B are explanatory diagrams illustrating arrangement of the feature data.

In FIG. 8A, a mesh of the 3D map data before parallel projection is indicated by a solid line, an image for the left eye by a broken line, and an image for the right eye by a one-dot chain line in superposition. On the lower right, an enlarged view of two meshes is shown. In this example, the map data before parallel projection is prepared for each mesh aligned in a rectangular region as illustrated in regions M1 and M2 in the enlarged view. If each mesh is parallelly projected, each one is projected to a parallelogram region like images M1L and M2L for the left eye and images M1R and M2R for the right eye. In this example, the image for the left eye and the image for the right eye each having a parallelogram shape generated by the unit of mesh as above are stored without being aligned as illustrated in FIG. 8A. Therefore, if seen precisely, as illustrated in FIG. 5C, there is a discrepancy of approximately several pixels between the parallelogram regions.

FIG. 8B is an arrangement example of the feature data as a variation. In this example, a discrepancy generated between the parallelogram regions generated for each mesh are matched and arranged. As a result, the meshes M1 and M2 aligned vertically in the figure before parallel projection are aligned in a diagonally left direction like the regions M1L and M2L for the image for the left eye and in a diagonally right direction like the regions M1R and M2R for the image for the right eye. The feature data may be prepared in a format in which a discrepancy between the regions is matched as above.

C. Feature Data Generation Processing:

Subsequently, processing for generating feature data 211, that is, two-dimensional polygon data obtained by parallelly projecting the three-dimensional model of the feature for the right eye/left eye by changing the projection condition, respectively, will be described. This processing is processing executed mainly by the parallel projection unit 102 of the data generating apparatus 100 and processing executed by a CPU of the data generating apparatus 100 in terms of hardware.

Figure 9:
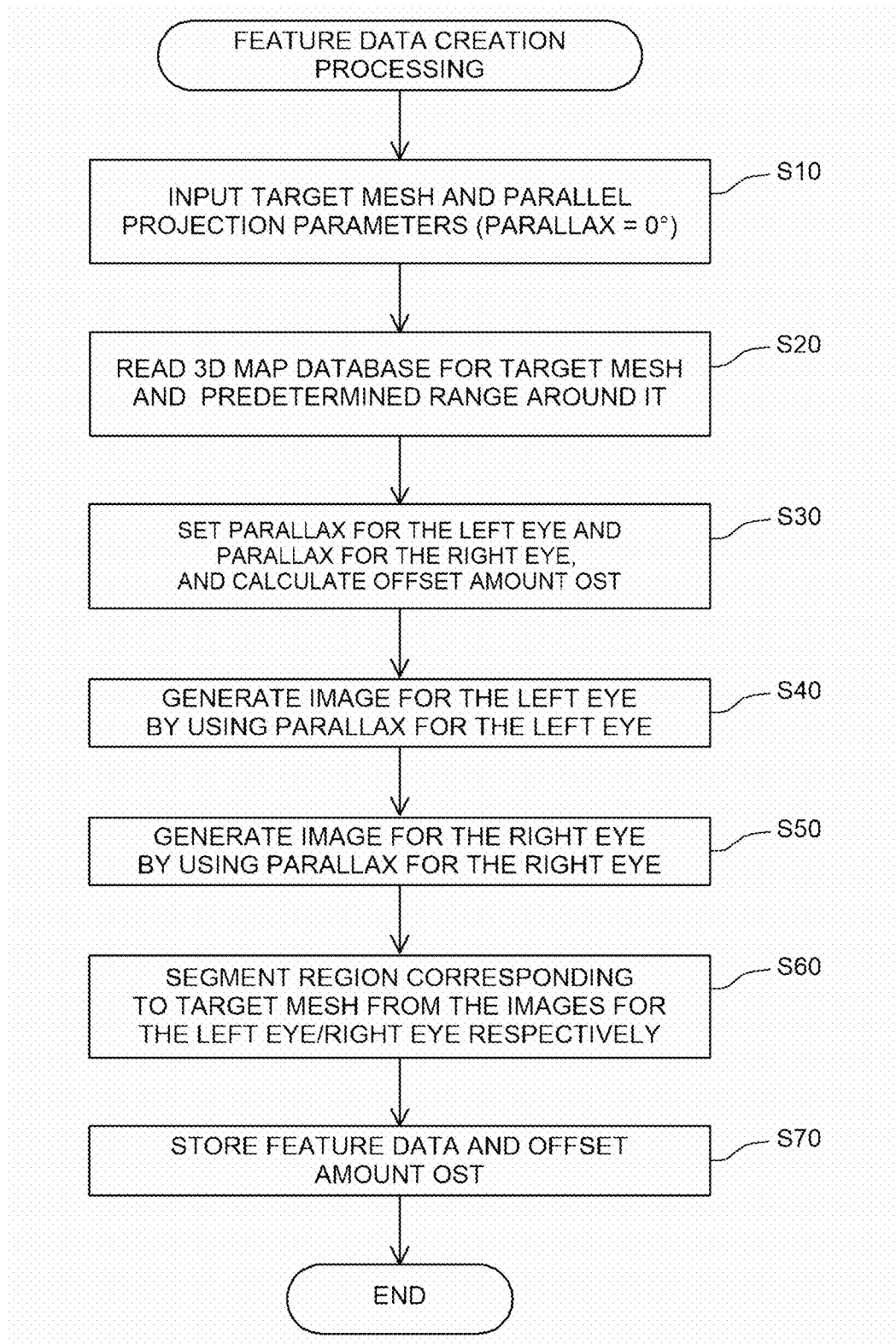
FIG. 9 is a flowchart of feature data generation processing in accordance with one embodiment of the present invention.

FIG. 9 is a flowchart of feature data generation processing.

When the processing is started, the data generating apparatus 100 specifies a mesh to be processed and inputs the parallel projection parameters (Step S10). As a method for specifying a mesh, an index unique to the mesh, a coordinate of the mesh and the like can be used. A method in which the mesh containing a coordinate value of a point specified by the operator on the map is analyzed by the data generating apparatus 100, and the mesh is set as a mesh to be processed.

The parallel projection parameters are a pitch angle and a projection azimuth. At this stage, parallax, that is, a yaw angle is set to 0 degrees. These may be specified by the operator each time the feature data is generated or a default value may be used.

The projection azimuth may be any one azimuth but in this example, parallel projection is performed for each of 8 azimuths obtained by shifting the azimuth by 45 degrees each so as to generate the feature data. By preparing the feature data in multiple azimuths as above, even if a blind spot such as behind a building is generated in any one of the projection azimuths, there is an advantage that display avoiding the blind spot can be realized using the other projection azimuths.

The parallel projection parameters can be arbitrarily set for either one of the pitch angle and the projection azimuth and can take various values as in a method of taking a single value, a method of using a plurality of values as parametric and the like.

Subsequently, the data generating apparatus 100 reads the 3D map database for a target mesh and a mesh in a predetermined range around the target mesh (Step S20). The reason for reading also the mesh in the predetermined range around it is as follows.

In this example, the feature data is generated by parallelly projecting a three-dimensional model included in the 3D map database from a diagonal direction inclined by predetermined projection angles with respect to the vertical direction. In the case of the parallel projection from the diagonal direction as above, a part of the feature present in the mesh around the mesh to be processed might be projected. On the contrary, if the parallel projection is performed using the 3D map database only for the target mesh, it lacks a projection of the feature present in another mesh, and appropriate feature data can not be obtained. In order to avoid this, in this example, the mesh around the target mesh is also read. The reading range can be arbitrarily set, but in this example, 3D map data belonging to meshes within 2 sections from the target mesh is read.

Subsequently, the data generating apparatus 100 sets parallax for the left eye and parallax for the right eye, that is, the respective yaw angles (Step S30). As illustrated in FIG. 1B above, the yaw angle is given as parallel projection parameters, and parallel projection is performed. In order to give parallax, signs of directions of the parallax for the left eye and the parallax for the right eye are set opposite to each other. This processing corresponds to processing of the projection parameter modification unit 106. Moreover, the offset amount OST is calculated using the parallel projection parameters set as above, that is, the pitch angle and the yaw angle. The offset amount is, as illustrated in FIG. 5B, a numeral value indicating a discrepancy between the parallelogram regions corresponding to each of the meshes after the parallel projection and is used for determining a scrolling direction in the images for the right/left eye as will be described later.

The data generating apparatus 100 generates the image for the left eye by performing parallel projection using the parallax for the left eye set as above (Step S40) and generates the image for the right eye by performing parallel projection using the parallax for the right eye (Step S50). The images generated, respectively, are two-dimensional image data expressing the feature three-dimensionally by parallel projection. The images for the left eye/right eye generated by parallel projection are called parallel projection data for the left eye/right eye in some cases.

The data generating apparatus 100 segments a region corresponding to the target mesh from the images for the left eye/right eye obtained as above, respectively (Step S60), and stores it with the offset amount OST as the feature data made of the image data for the left eye and the image data for the right eye (Step S70). The image data is stored as two-dimensional polygon data, but may also be stored as raster data. Moreover, in segmenting and storing the image data for the left eye/right eye, each polygon may be provided with attributes such as a name, a position, a shape and the like.

By executing the above processing for all the projection azimuths and all the meshes, the data generating apparatus 100 can provide the feature data 211 of this example.

Figure 10:
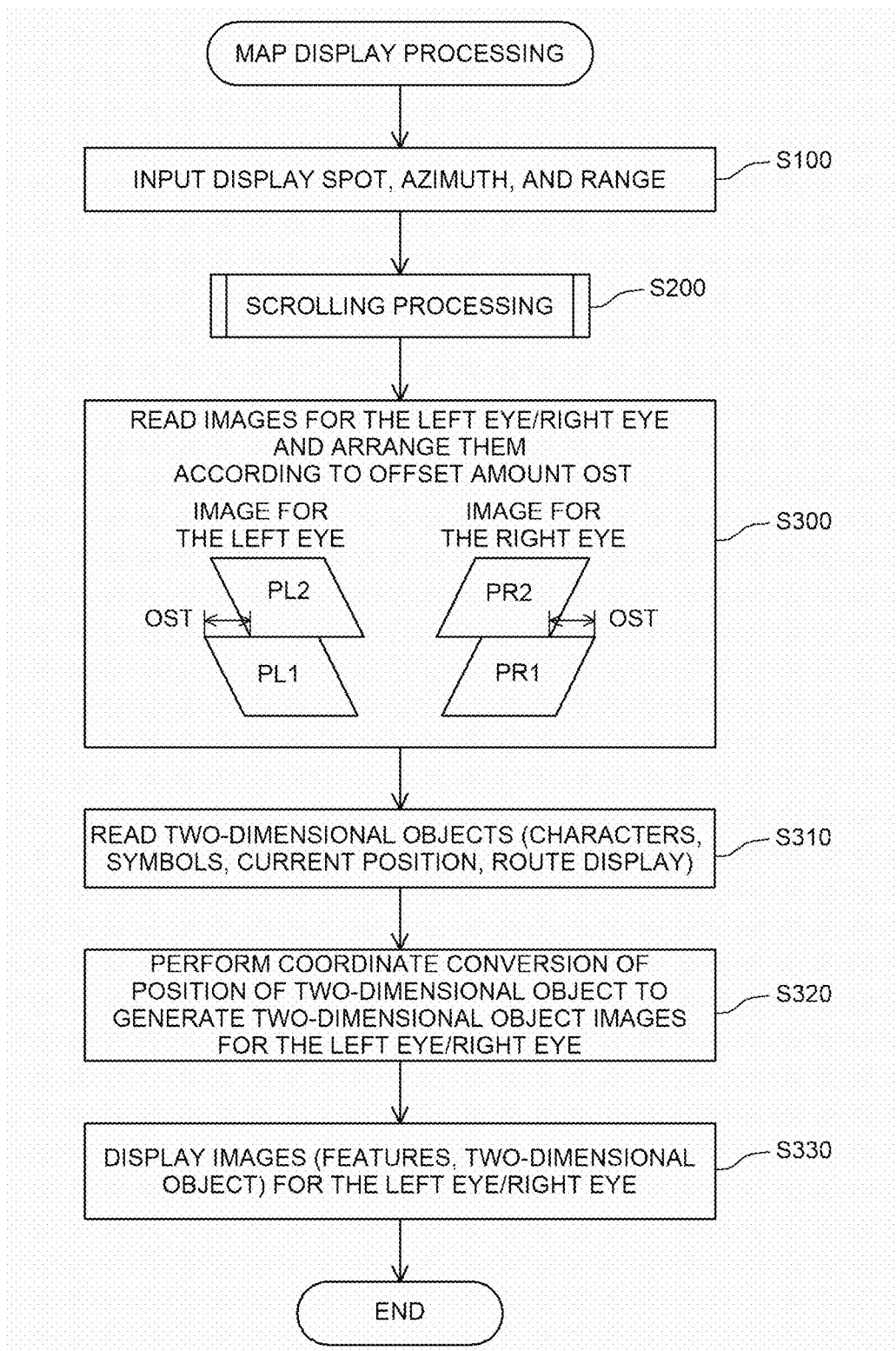
FIG. 10 is a flowchart of map display processing in accordance with one embodiment of the present invention.

D. Map Display Processing:

D1. Entire Processing:

FIG. 10 is a flowchart of map display processing. Here, an example of processing in which a map to be a background is displayed to be capable of stereoscopic vision in accordance with the spot and azimuth specified by the user, and a two-dimensional object such as a character and the like is displayed to be capable of stereoscopic vision in front of it is illustrated. This processing can be also used as route guidance display by being used together with the route search.

The map display processing is processing executed by the main control unit 304 and the display control unit 306 of the terminal 300 and is processing executed by a CPU of the terminal in terms of hardware.

In this processing, first, the terminal 300 inputs a display spot, an azimuth, and a range specified by the user (Step S100). The display spot may use a current position obtained by GPS, for example.

Then, the terminal 300 executes scrolling processing in accordance with the specified display position and the like (Step S200). Though contents of the scrolling processing will be described later, this is processing in which, if the specified display spot has been moved from the previous spot, that is, if scrolling is specified by the user, scrolling directions suitable for the image for the left eye and the image for the right eye are determined, and the display spot is set for each of the image for the left eye and the image for the right eye.

The terminal 300 reads parallel projection data for the left eye/right eye from the map information storage unit 305 in accordance with a result of the scrolling processing (Step S300). If data of a region not accumulated in the map information storage unit 305 is needed, the terminal 300 downloads the data from the server 200.

Here, in the parallel projection data for the left eye/right eye, in this example, as illustrated in FIG. 8A, a discrepancy only by the offset amount OST is generated between each of the parallelogram regions. Thus, when the parallel projection data for the left eye/right eye is read at Step S300, the terminal 300 arranges it with a shift only by the offset amount OST between the regions in a direction to solve this discrepancy. As illustrated in the figure, since there is a discrepancy only by the offset amount OST between images for the left eye PL1 and PL2, the region PL2 is shifted to the left side only by the offset amount OST so as to match the region PL1. Since there is a discrepancy also between images for the right eye PR1 and PR2, the region PR2 is shifted to the right side only by the offset amount OST so as to match the region PR1.

Subsequently, the terminal 300 similarly reads data of the two-dimensional objects (characters, symbols (including map symbols/traffic restriction signs), current position, a route display and the like) from the map information storage unit 305 (Step S310). Regarding the two-dimensional objects, only those required may be read depending on the function of the map and the like.

Since a display position is specified in the three-dimensional space for the two-dimensional object, the terminal 300 applies coordinate conversion processing to the read two-dimensional object and moreover, gives parallax by shifting the position of the two-dimensional object to left or right for each of the image for the left eye and the image for the right eye so as to generate two-dimensional object images for the left eye/right eye (Step S320).

The above described coordinate conversion can be achieved by rotating the three-dimensional position information around the y-axis only by a projection azimuth (assumed to be $\beta$ degrees) on the basis of the pitch angle and the projection azimuth as parallel projection parameters and then, by acquiring a coordinate conversion matrix for rotation around the x-axis only by the pitch angle (assumed to be $\theta$ degrees) and by having this coordinate conversion matrix act on the position of the two-dimensional object.

The parallax for the left eye/right eye of the two-dimensional object can be made on the basis of setting of a display depth. The display depth may be the same for all the two-dimensional objects or may be changed in accordance with the type of the two-dimensional objects. For example, it may be so configured that priority is set in order of the character, symbol, and route display so that the characters are displayed on the foremost side and then, the symbols indicating the current position and traffic restriction, and the route display is displayed on the depth in this order. Moreover, if the two-dimensional objects are overlapped, their display depths may be made different from each other.

By setting the display depth as above, the two-dimensional object is set at a three-dimensional position corresponding to a set display depth h, and a rotation matrix by the parallax (yaw angle) $\delta$ is made to act so as to obtain displacement of an x-coordinate, which becomes a shifting amount of the two-dimensional object for the right eye/left eye. At this time, the shifting amount is a function of the display depth h and can be given by "shifting amount=h·tan $\delta$".

Lastly, the terminal 300 displays the images for the left eye/right eye, that is, the feature and the two-dimensional object in a superposed manner (Step S330) and finishes the map display processing. By recognizing the image for the right eye displayed as above by the right eye and the image for the left eye by the left eye, the user can stereoscopically view the map of the background and the two-dimensional object.

The parallel projection data for the left eye/right eye is only two-dimensional polygon data after parallel projection has been performed, and thus, stereoscopic vision can be realized with a light load only by drawing a polygon in accordance with the obtained data without performing projection processing in the processing at Step S501.

Figure 11:
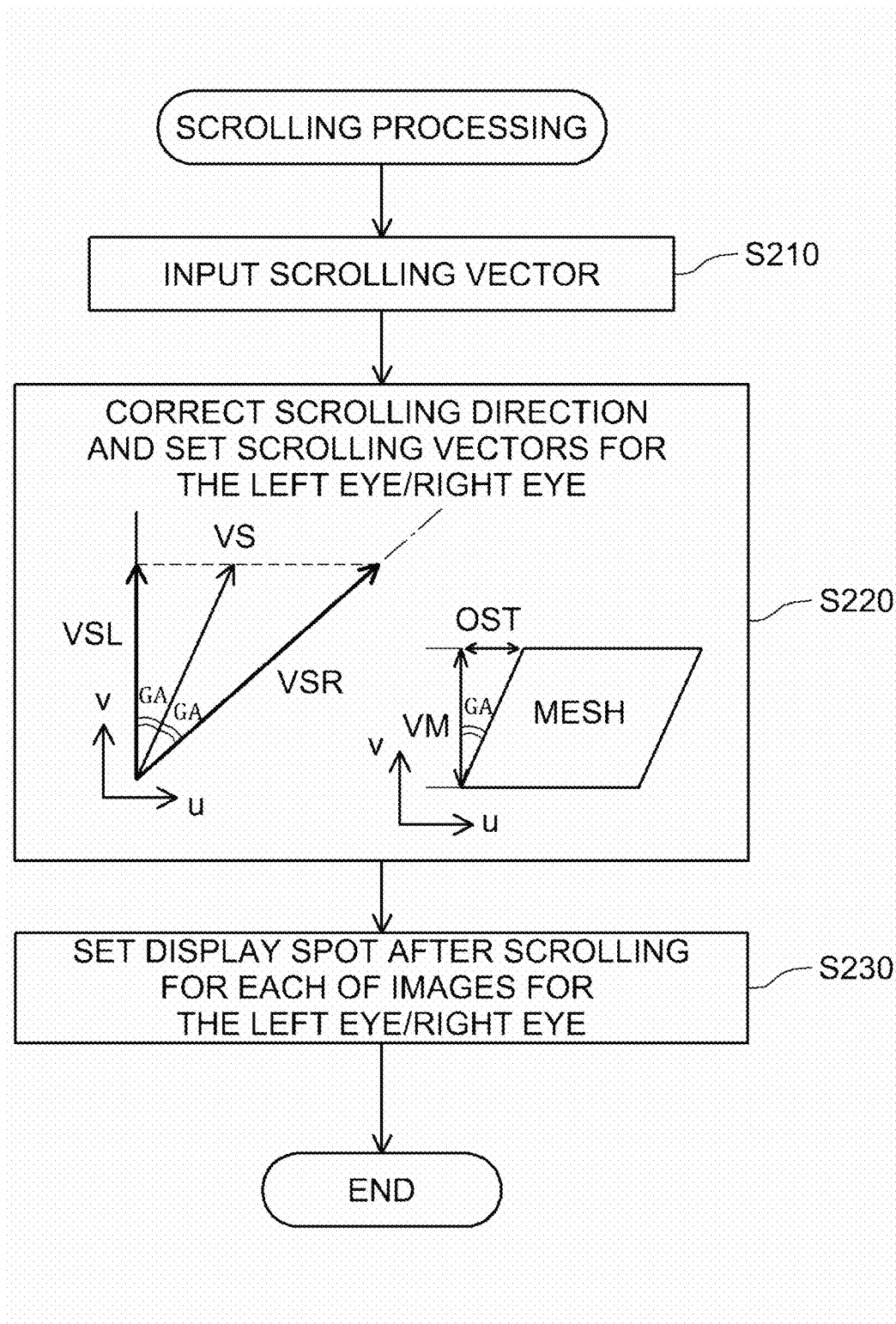
FIG. 11 is a flowchart of scrolling processing in accordance with one embodiment of the present invention.

D2. Scrolling Processing:

FIG. 11 is a flowchart of the scrolling processing. It is processing corresponding to Step S200 in the map display processing (FIG. 10) and corresponds to processing executed by the scrolling setting unit 307 of the terminal 300.

When this processing is started, the terminal 300 inputs a scrolling vector (Step S210). The scrolling vector is a vector in a moving direction of the map, that is, a vector going from the preceding display spot to a newly instructed display spot. This scrolling vector corresponds to the moving direction in a three-dimensional model before parallel projection since the user with stereoscopic vision specifies a direction to be visually recognized on its stereoscopic map.

The terminal 300 subsequently corrects a scrolling direction and sets scrolling vectors for the left eye/right eye (Step S220).

A method of correcting the scrolling direction is illustrated in the figure. In a diagram illustrated on the right side in the figure, assuming that the scrolling is specified in a vertical v-axis direction in the three-dimensional model, for example, since the mesh is changed to a parallelogram by parallel projection, the scrolling direction corresponding to the specified scrolling is a direction along a diagonal side in this parallelogram region. That is, the scrolling direction in the v-axis direction needs to be corrected only by a correction angle $\gamma$. This angle $\gamma$ can be acquired on the basis of a ratio of a distance VM in the v-axis direction of the mesh to the offset amount OST. That is, it is tan $\gamma$=OST/VM. Since the correction angle $\gamma$ is a value uniquely determined when the parallel projection parameters (pitch angle, yaw angle) are determined, it may be calculated in advance similarly to the offset amount OST.

The terminal 300 corrects a scrolling vector VS on the basis of the correction angle $\gamma$ as illustrated in a diagram on the left side. That is, for the image for the right eye, a vector VSR in a direction obtained by rotating the scrolling vector VS clockwise only by the correction angle $\gamma$ is a scrolling direction, while for the image for the left eye, a vector VSL in a direction obtained by rotation to the opposite direction only by the correction angle $\gamma$ is a scrolling direction.

The direction for scrolling needs to be corrected due to the influence of the parallel projection as above, but an advance distance in the v-axis direction needs to be matched for the left/right eyes. Therefore, sizes of the scrolling vectors VSL and VSR for the images for the left eye/right eye are set so that the scrolling vectors VSL and VSR for the images for the left eye/right eye and a tip end of the scrolling vector VS are aligned on a straight line in parallel with the u-axis.

The terminal 300 sets the display spot after scrolling for each of the images for the left eye/right eye on the basis of the scrolling vectors VSL and VSR for the images for the left eye/right eye set by the processing above (Step S230), and finishes the scrolling processing.

E. Effects:

According to the stereoscopic map display system of this example described above, the stereoscopic vision can be realized by parallel projection. In the parallel projection, the images for the left eye/right eye for stereoscopic vision can be generated for all the regions in advance regardless of a position of a viewpoint, and stereoscopic vision can be realized with an extremely light load.

Moreover, in this example, since the scrolling direction is individually set for the images for the left eye/right eye when scrolling is instructed, an influence caused by deformation of the original mesh into a parallelogram by parallel projection can be avoided, and scrolling in a state in which stereoscopic vision is maintained can be realized.

F. Variation:

In the example, the feature data and the two-dimensional object are prepared separately, and a method of giving parallax to the two-dimensional object at the time when display is exemplified. On the other hand, an aspect in which the images for the left eye/right eye are prepared in a state in which the two-dimensional object and the feature data are superposed may be employed. An example using such method is illustrated as a variation.

Figure 12A:
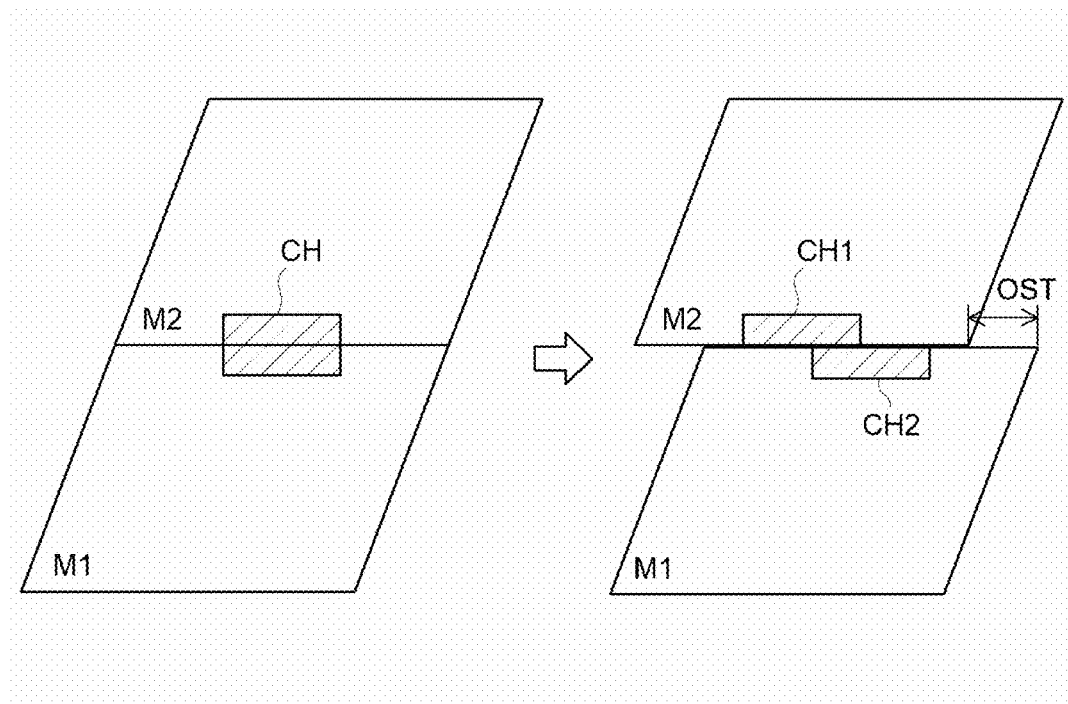
FIGS. 12A and 12B are explanatory diagrams illustrating arrangement examples of a character image in a variation in accordance with one embodiment of the present invention.
Figure 12B:
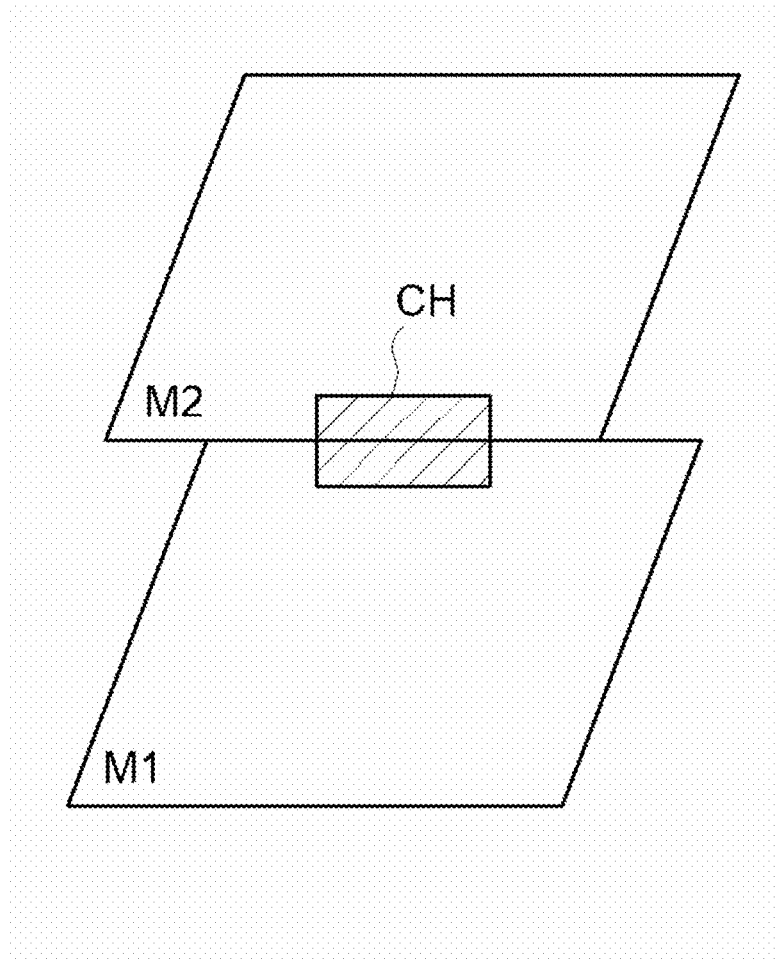

FIGS. 12A and 12B are explanatory diagrams illustrating arrangement examples of a character image in the variation. As described above, a problem occurring if the two-dimensional object is superposed on the feature data in advance will be described.

FIG. 12A illustrates an influence of parallel projection to the two-dimensional object. As illustrated on the left side in FIG. 12A, the meshes in the map are deformed into parallelogram regions M1 and M2 by parallel projection. At the time of the parallel projection, the regions M1 and M2 are stored in a state in which a discrepancy with the offset amount OST is generated between them, as illustrated on the right side in the figure, but in the map display processing, this offset amount is corrected (see Step S300 in FIG. 10) and displayed in an aligned state as illustrated on the left side in FIG. 12A.

In such a case, assume that the characters CH are displayed on a boundary portion between the regions M1 and M2 as a hatched portion in the figure. The characters CH are assumed to be superposed as an image on the regions M1 and M2 in advance. At this time, the characters CH should be displayed without a discrepancy on the boundary between the regions M1 and M2 as illustrated on the left side in FIG. 12A with the offset amount corrected. Therefore, in the feature data of each of the regions M1 and M2 before the offset amount is corrected (state on the right side in FIG. 12A), characters CH1 and CH2 need to be in a state with a discrepancy by an amount corresponding to the offset amount OST on the boundary of the regions M2 and M2.

That is, if the characters CH are drawn in a state in which the regions M1 and M2 are stored and superposed on the image data of the feature as illustrated in FIG. 12B, when the offset amount is corrected as in FIG. 12A, the characters CH would have a discrepancy between the boundaries.

In the variation, while the offset amount is reflected at a display position of the character in the vicinity of the boundary as above, the feature data in which the image data of the feature and the image of the character are superposed is generated.

Figure 13:
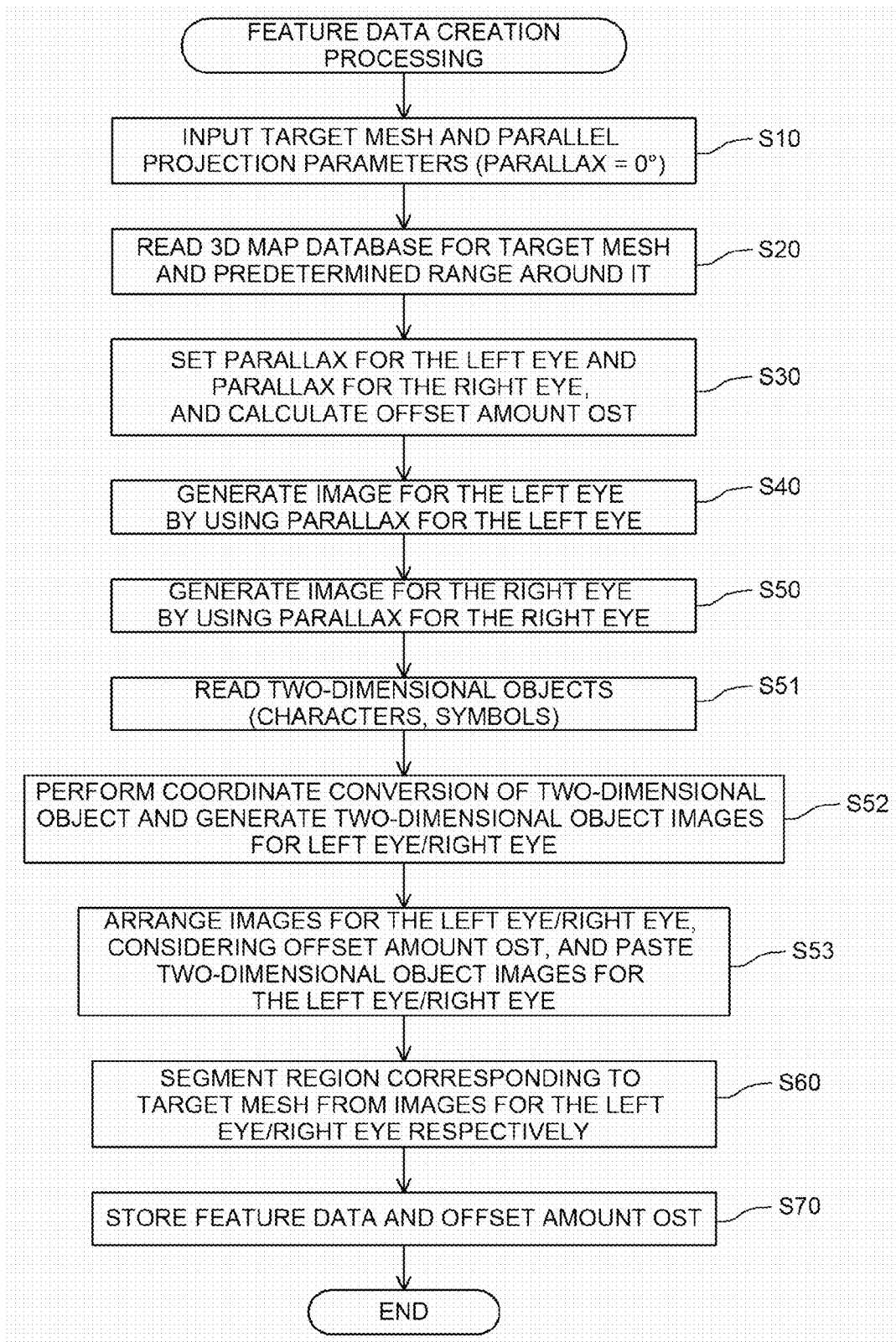
FIG. 13 is a flowchart of feature data generation processing in the variation in accordance with one embodiment of the present invention.

FIG. 13 is a flowchart of the feature data generation processing in the variation.

Processing for generating an image for the left eye and an image for the right eye expressing a feature using 3D map data is the same as Steps S10 to S50 in the example (FIG. 9). Subsequently, the data generating apparatus 100 reads the two-dimensional objects (characters, symbols) to be displayed in the map (Step S51). Here, instead of the two-dimensional object dynamically moving when the map is displayed as the current position or the route guidance display, a two-dimensional object that can be prepared as map data in advance is a target.

Then, the feature data generating apparatus 100 performs coordinate conversion of the two-dimensional object and generates two-dimensional object images for the left eye/right eye (Step S52). This coordinate conversion is processing to convert a display position of the two-dimensional object to a display position in the images for the left eye/right eye on the basis of the parallel projection parameters. The coordinate conversion also includes processing of shifting the display position of the two-dimensional object for the images for the left eye/right eye to left or right in order to give parallax.

If the two-dimensional object image is generated for each of the images for the left eye/right eye, the feature data generating apparatus 100 arranges the images for the left eye/right eye, considering the offset amount OST, and pastes the two-dimensional object images for the left eye/right eye (Step S53). And then, the feature data generating apparatus 100 segments a region corresponding to the target mesh from each of the images for the left eye/right eye (Step S60) and stores the feature data and the offset amount OST (Step S70).

By means of the processing at Step S53 and after, the characters CH are arranged with a discrepancy between the character regions M1 and M2 as illustrated on the right side in FIG. 12A. However, when this processing is performed, there is no need to perform processing of dividing the images of the characters CH into each region and shifting them or the like. As described above, the images for the left eye/right eye are generated for each region, and a method for generating a parallel projection image including the periphery of the target mesh and of segmenting the regions M1, M2 and the like corresponding to the target meshes is used as its method. Therefore, when the region M2 is to be generated, it is only necessary to arrange the entire character image including a portion protruding the region M2 at a position of CH1 on the right side in FIG. 12A. By segmenting the portion corresponding to the region M2 from this, feature data including only the portion of the character CH1 is generated without performing complicated image processing. The same applies to the region M1. When the region M1 is to be generated, it is only necessary to arrange the entire character image at the position of the characters CH2 and then, to segment a portion corresponding to the region M1.

Figure 14A:
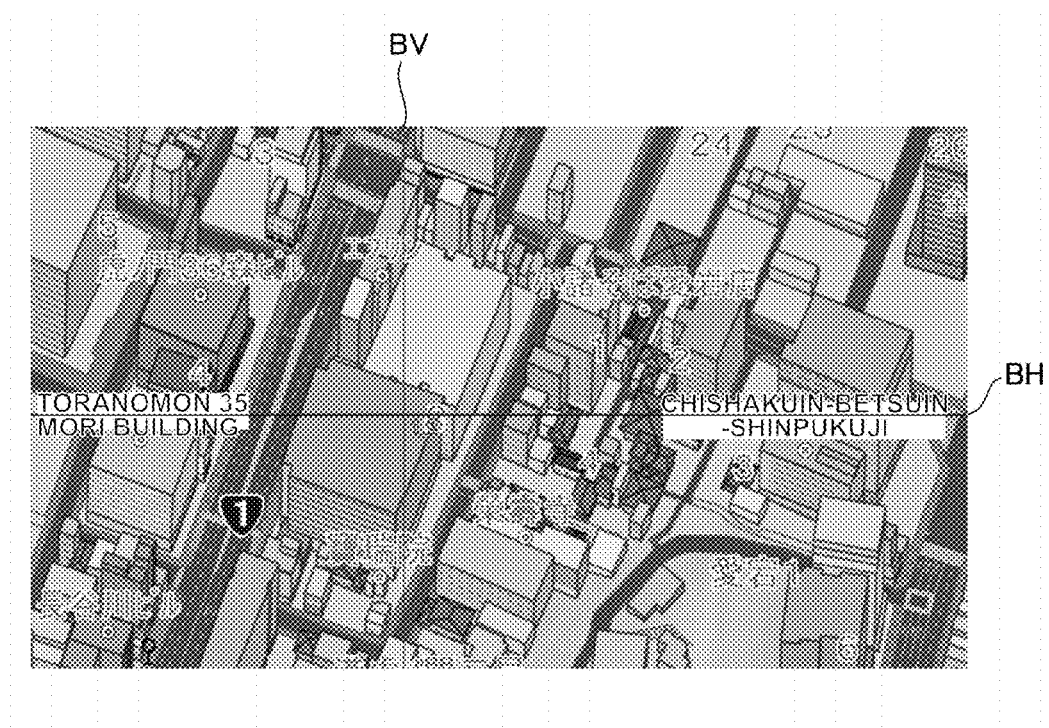
FIGS. 14A and 14B are explanatory diagrams illustrating a feature data example in the variation in accordance with one embodiment of the present invention.
Figure 14B:
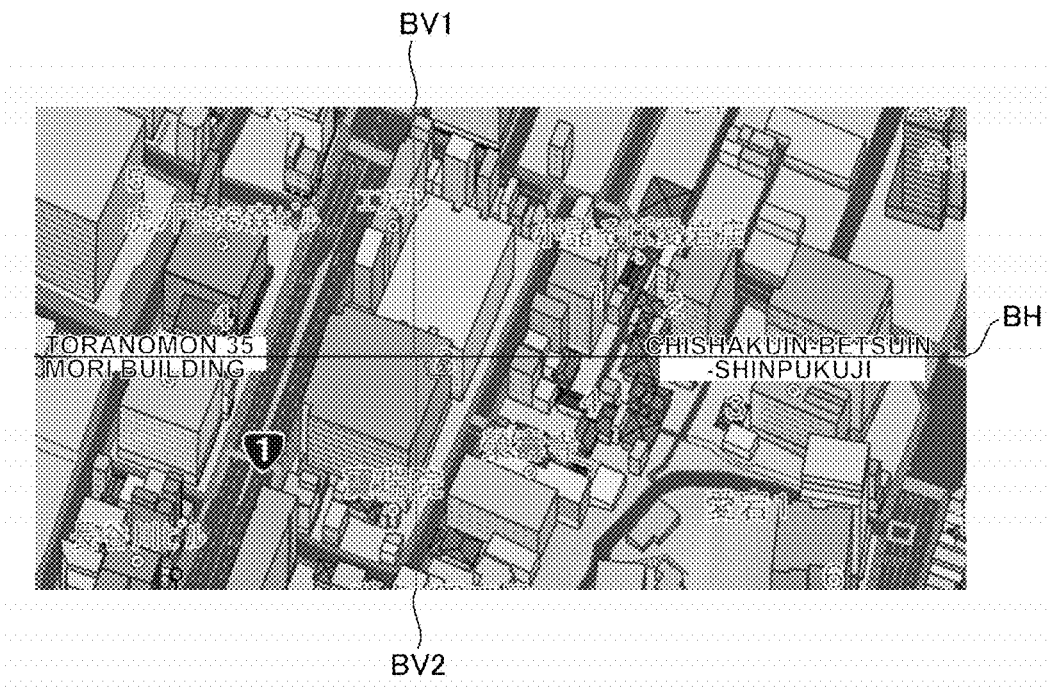

FIGS. 14A and 14B are explanatory diagrams illustrating a feature data example in the variation.

FIG. 14A illustrates feature data before correction for the offset amount is made when the map is to be displayed. Here, the region is expressed having a rectangular shape. Such state can be easily realized by segmenting not in a parallelogram but in a rectangular shape in segmentation (Step S60) in the feature data generation processing (FIG. 13).

In FIG. 14A, since correction for the offset amount has not been made, boundaries BH and BV are aligned linearly. However, it is known that character strings "Toranomon 35 Mori Building" and "Chishakuin-Betsuin-Shinpukuji" across the boundary BH have a horizontal discrepancy between an upper side and a lower side of the boundary BH. This is a state corresponding to a discrepancy between the characters CH1 and Ch2 indicated on the right side in FIG. 12A above.

FIG. 14B illustrates a state in which the offset amount has been corrected. That is, boundaries BV1 and BV2 in the longitudinal direction have a discrepancy in the vertical direction of the boundary BH. As the result of the correction of the offset amount as above, the discrepancy in the character string across the boundary BH is modified, and the character string is displayed in a state without a discrepancy.

According to the variation described above, similarly to the example, the stereoscopic vision can be realized with a light load using the images for the left eye/right eye generated by parallel projection in advance, and since it is generated within the images for the left eye/right eye including also the characters, the processing load for displaying characters can be also reduced, and the stereoscopic vision can be realized with a lighter processing load. Moreover, in the variation, since the characters are arranged on the basis of the correction for the offset amount at display in advance, characters can be displayed without a discrepancy at the boundary between each region at the display.

In the variation, the two-dimensional objects which move during display such as the current position, route guidance and the like may be further included. These two-dimensional objects can be displayed by giving parallax at the display similarly to the example.

The examples of the present invention have been described. The stereoscopic map display system does not necessarily have to be provided with all the functions in the above described examples, but only a part of them may be realized. Moreover, an additional function may be provided in the above described contents.

The present invention is not limited to the above described examples, and it is needless to say that various configurations can be employed within a range not departing from the gist thereof. For example, the portion constituted by hardware in the examples may be constituted by software and vice versa. Moreover, not only a map but various stereoscopic images can be used as targets. Furthermore, an output of a stereoscopic image is not limited to display on a display but may be printed.

The present invention can be used to provide a stereoscopic image using parallel projection.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A stereoscopic image output system for generating stereoscopic vision of an image, comprising:
   a stereoscopic vision display unit configured to display a first image for the left eye and a second image for the right eye with parallax so that the first and second images are visually recognized by the left eye and the right eye, respectively, thereby realizing stereoscopic vision;
   an image database storage unit that stores first parallel projection data for the left eye and second parallel projection data for the right eye as two-dimensional drawing data, the first and second parallel projection data having been obtained by parallel-projecting a three-dimensional model as a target of the stereoscopic vision on a plane from first and second diagonal directions inclined from a vertical direction by first and second predetermined projection angles, respectively, thereby generating the parallax between the left and right eyes;
   an output control unit that reads from the image database storage unit the first and second parallel projection data for a specified display range and outputs to the stereoscopic vision display unit the first and second images with the parallax based on the read first and second parallel projection data, so as to realize the stereoscopic vision for the specified display range,
   wherein if the specified display range is moved to a new display range by scrolling the stereoscopic vision, the output control unit determines a first scrolling direction for the first image and a second scrolling direction for the second image, respectively, based on parameters of the parallel projection by which the first and second parallel projection data was obtained, reads the first and second parallel projection data for the new display range in accordance with the first and second scrolling directions, respectively, and outputs to the stereoscopic vision display unit the first and second images corresponding to the thus read first and second parallel projection data so as to realize stereoscopic vision for the new display range, the second scrolling direction being different from the first scrolling direction.

2. The stereoscopic image output system according to claim 1, wherein:
   the image data storage unit further stores two-dimensional object data for generating a two-dimensional object to be displayed at a specified output position with the stereoscopic vision; and
   the output control unit outputs a first image of the two-dimensional object for the left eye and a second image of the two-dimensional object for the right eye by providing parallax by offsetting the two-dimensional object data to left or right with respect to the specified output position.

3. The stereoscopic image output system according to claim 1, wherein:
   the image data storage unit further stores two-dimensional object data for outputting a two-dimensional object to be displayed at a specified output position with the stereoscopic vision of the image; and
   the output control unit provides a first image of the two-dimensional object for the left eye and a second image of the two-dimensional object for the right eye with parallax by offsetting the two-dimensional object data to left or right with respect to the specified output position.

4. The stereoscopic image output system according to claim 1, wherein the stereoscopic vision of the image is a stereoscopic map.

5. An apparatus for generating image data for a stereoscopic image output system which provides stereoscopic vision of an image by displaying a first image for the left eye and a second image for the right eye with parallax so that the first and second images are visually recognized by the left eye and the right eye, respectively, the apparatus comprising:
   a 3D image database storage unit that stores area data including:
      a three-dimensional model which is a target of the stereoscopic vision; and
      two-dimensional object data of a two-dimensional object to be displayed with the stereoscopic vision;
   a parallel projection unit configured to generate first parallel projection data for the left eye and second parallel projection data for the right eye as two-dimensional drawing data by parallel-projecting the three-dimensional model on a plane form first and second diagonal directions inclined from a vertical direction by first and second predetermined projection angles, respectively, thereby generating first parallax between the left and right eyes, the area data being divided into meshes having a predetermined size such that the parallel projection is performed mesh by mesh;
   a two-dimensional object image data generating unit configured to generate first two-dimensional object image data for the left eye and second two-dimensional object image data for the right eye by offsetting the two-dimensional object data to left or right with respect to a specified output position so as to provide second parallax thereto; and
   a superposition processing unit configured to generate first image data for the left eye and second image data for the right eye by superposing the generated first and second two-dimensional object image data on the first and second parallel projection data at respective positions in accordance with the first and second parallaxes.

6. The apparatus according to claim 5, wherein the stereoscopic vision of the image is a stereoscopic map.

7. A method for generating stereoscopic vision of an image, executed by a computer, comprising the steps of:

reading, by the computer, from an image database storage unit first parallel projection data for the left eye and second parallel projection data for the right eye as two-dimensional drawing data for a specified display range, the first and second parallel projection data having been obtained by parallel-projecting a three-dimensional model as a target of the stereoscopic vision on a plane from first and second diagonal directions inclined from a vertical direction by first and second predetermined projection angles, respectively, thereby generating parallax between the left and right eyes, and stored in the image database storage unit; and displaying on a stereoscopic vision display unit controlled by the computer, a first image for the left eye and a second image for the right eye with the parallax based on the first and second parallel projection data read from the image database storage unit, respectively, such that the first and second images are visually recognized by the left eye and the right eye, respectively, thereby realizing the stereoscopic vision for the specified display range;

if the specified display range is moved to a new display range by scrolling the stereoscopic vision, determining a first scrolling direction for the first image and a second scrolling direction for the second image, respectively, based on parameters of the parallel projection by which the first and second parallel projection data was obtained;

reading the first and second parallel projection data for the new display range by scrolling the first and second parallel projection data in accordance with the first and second scrolling directions, respectively, the second scrolling direction being different from the first scrolling direction; and outputting and displaying the first and second images based on the thus read first and second parallel projection data, respectively, so as to realize stereoscopic vision for the new display range resulted from the scrolling.

8. The method according to claim 7, wherein the stereoscopic vision of the image is a stereoscopic map.

9. A non-transitory computer-readable medium storing a computer program for generating stereoscopic vision of an image using a stereoscopic vision display unit, allowing a computer to realize functions of:

reading from an image database storage unit first parallel projection data for the left eye and second parallel projection data for the right eye as two-dimensional drawing data for a specified display range, the first and second parallel projection data having been obtained by parallel-projecting a three-dimensional model as a target of the stereoscopic vision on a plane from first and second diagonal directions inclined from a vertical direction by first and second predetermined projection angles, respectively, thereby generating parallax between the left and right eyes;

displaying on the stereoscopic vision display unit a first image for the left eye and a second image for the right eye with parallax for the specified display range based on the first and second parallel projection data read from the image database storage unit, respectively, such that the first image and the second image are visually recognized by the left eye and the right eye, respectively, thereby realizing stereoscopic vision;

if the display range is moved to a new display range by scrolling the stereoscopic vision, determining a first scrolling direction of the first image and a second scrolling direction of the second image, respectively, based on parameters of the parallel projection by which the first and second parallel projection data was obtained;

reading from the image database storage unit the first and second parallel projection data for the new display range by scrolling the first and second parallel projection data in accordance with the first and second scrolling directions, respectively, and outputting and displaying the first and second images based on the thus read first and second parallel projection data, respectively, so as to realize stereoscopic vision for the new display range resulted from the scrolling.

10. The non-transitory computer-readable medium according to claim 9, wherein the stereoscopic vision of the image is a stereoscopic map.

* * * * *